(12) United States Patent
Burrow

(10) Patent No.: US 11,231,257 B2
(45) Date of Patent: Jan. 25, 2022

(54) METHOD OF MAKING A METAL INJECTION MOLDED AMMUNITION CARTRIDGE

(71) Applicant: TRUE VELOCITY IP HOLDINGS, LLC, Garland, TX (US)

(72) Inventor: Lonnie Burrow, Carrollton, TX (US)

(73) Assignee: TRUE VELOCITY IP HOLDINGS, LLC, Garland, TX (US)

( * ) Notice: Subject to any disclaimer, the term of this patent is extended or adjusted under 35 U.S.C. 154(b) by 0 days.

(21) Appl. No.: 16/800,196

(22) Filed: Feb. 25, 2020

(65) Prior Publication Data
US 2020/0256654 A1   Aug. 13, 2020

Related U.S. Application Data

(63) Continuation of application No. 16/017,142, filed on Jun. 25, 2018, now Pat. No. 10,612,896, which is a
(Continued)

(51) Int. Cl.
*F42B 5/02*   (2006.01)
*F42B 5/285*   (2006.01)
(Continued)

(52) U.S. Cl.
CPC ............ *F42B 5/02* (2013.01); *B29C 45/0046* (2013.01); *F42B 5/26* (2013.01); *F42B 5/285* (2013.01); *F42B 5/36* (2013.01)

(58) Field of Classification Search
CPC ... B29C 24/0046; B29C 45/0053; F42B 5/28; F42B 5/295; F42B 5/02; F42B 5/26; F42B 5/285; F42B 5/36
(Continued)

(56) References Cited

U.S. PATENT DOCUMENTS

| 99,528 A | 2/1870 | Boyd |
| 113,634 A | 4/1871 | Crispin |

(Continued)

FOREIGN PATENT DOCUMENTS

| CA | 2813634 A1 | 4/2012 |
| CN | 102901403 B | 6/2014 |

(Continued)

OTHER PUBLICATIONS

International Search Report and Written Opinion in PCT/US2020/023273 dated Oct. 7, 2020; pp. 1-11.
(Continued)

*Primary Examiner* — Bret Hayes
(74) *Attorney, Agent, or Firm* — Singleton Law, PLLC; Chainey P. Singleton

(57) ABSTRACT

The present invention provides a method of making a metal injection molded ammunition cartridge comprising the steps of: providing an ammunition cartridge mold comprising a bottom portion having a primer recess extending into the bottom portion adapted to receive a primer, a flash hole positioned in the primer recess through the bottom surface; side walls extending from the bottom portion to a nose end aperture, wherein a propellant chamber is formed between the nose end aperture and the bottom surface; injecting a metal composition into the ammunition cartridge mold to form a metal injection molded ammunition cartridge; and removing the metal injection molded ammunition cartridge from the ammunition cartridge mold.

9 Claims, 17 Drawing Sheets

Related U.S. Application Data continuation of application No. 14/863,800, filed on Sep. 24, 2015, now Pat. No. 10,041,770, which is a continuation of application No. 14/011,202, filed on Aug. 27, 2013, now Pat. No. 9,546,849, which is a continuation of application No. 13/292,843, filed on Nov. 9, 2011, now Pat. No. 8,561,543.

(60) Provisional application No. 61/456,664, filed on Nov. 10, 2010.

(51) Int. Cl.
*B29C 45/00* (2006.01)
*F42B 5/26* (2006.01)
*F42B 5/36* (2006.01)

(58) Field of Classification Search
USPC .................................. 102/468, 470
See application file for complete search history.

(56) References Cited

U.S. PATENT DOCUMENTS

| | | |
|---|---|---|
| 130,679 A | 8/1872 | Whitmore |
| 159,665 A | 2/1875 | Gauthey |
| 169,807 A | 11/1875 | Hart |
| 207,248 A | 8/1878 | Bush et al. |
| 462,611 A | 11/1891 | Comte de Sparre |
| 475,008 A | 5/1892 | Bush |
| 498,856 A | 6/1893 | Overbaugh |
| 498,857 A | 6/1893 | Overbaugh |
| 640,856 A | 1/1900 | Bailey |
| 662,137 A | 11/1900 | Tellerson |
| 676,000 A | 6/1901 | Henneberg |
| 743,242 A | 11/1903 | Bush |
| 865,979 A | 9/1907 | Bailey |
| 869,046 A | 10/1907 | Bailey |
| 905,358 A | 12/1908 | Peters |
| 957,171 A | 5/1910 | Loeb |
| 963,911 A | 7/1910 | Loeble |
| 1,060,817 A | 5/1913 | Clyne |
| 1,060,818 A | 5/1913 | Clyne |
| 1,064,907 A | 6/1913 | Hoagland |
| 1,187,464 A | 6/1916 | Offutt |
| 1,936,905 A | 11/1933 | Gaidos |
| 1,940,657 A | 12/1933 | Woodford |
| 2,294,822 A | 9/1942 | Norman |
| 2,465,962 A | 3/1949 | Allen et al. |
| 2,654,319 A | 10/1953 | Roske |
| 2,823,611 A | 2/1958 | Thayer |
| 2,862,446 A | 12/1958 | Lars |
| 2,918,868 A | 12/1959 | Lars |
| 2,936,709 A | 5/1960 | Seavey |
| 2,953,990 A | 9/1960 | Miller |
| 2,972,947 A | 2/1961 | Fitzsimmons et al. |
| 3,034,433 A | 5/1962 | Karl |
| 3,099,958 A | 8/1963 | Daubenspeck et al. |
| 3,157,121 A | 11/1964 | Daubenspeck et al. |
| 3,159,701 A | 12/1964 | Herter |
| 3,170,401 A | 2/1965 | Johnson et al. |
| 3,171,350 A | 3/1965 | Metcalf et al. |
| 3,242,789 A | 3/1966 | Woodring |
| 3,256,815 A | 6/1966 | Davidson et al. |
| 3,288,066 A | 11/1966 | Hans et al. |
| 3,292,538 A | 12/1966 | Hans et al. |
| 3,332,352 A | 7/1967 | Olson et al. |
| 3,444,777 A | 5/1969 | Lage |
| 3,446,146 A | 5/1969 | Stadler et al. |
| 3,485,170 A | 12/1969 | Scanlon |
| 3,485,173 A | 12/1969 | Morgan |
| 3,491,691 A | 1/1970 | Vawter |
| 3,565,008 A | 2/1971 | Gulley et al. |
| 3,590,740 A | 7/1971 | Herter |
| 3,609,904 A | 10/1971 | Scanlon |
| 3,614,929 A | 10/1971 | Herter et al. |
| 3,659,528 A | 5/1972 | Santala |
| 3,688,699 A | 9/1972 | Horn et al. |
| 3,690,256 A | 9/1972 | Schnitzer |
| 3,745,924 A | 7/1973 | Scanlon |
| 3,749,021 A | 7/1973 | Burgess |
| 3,756,156 A | 9/1973 | Schuster |
| 3,765,297 A | 10/1973 | Skochko et al. |
| 3,768,413 A | 10/1973 | Ramsay |
| 3,797,396 A | 3/1974 | Reed |
| 3,842,739 A | 10/1974 | Scanlon et al. |
| 3,866,536 A | 2/1975 | Greenberg |
| 3,874,294 A | 4/1975 | Hale |
| 3,955,506 A | 5/1976 | Luther et al. |
| 3,977,326 A | 8/1976 | Anderson et al. |
| 3,990,366 A | 11/1976 | Scanlon |
| 4,005,630 A | 2/1977 | Patrick |
| 4,020,763 A | 5/1977 | Iruretagoyena |
| 4,132,173 A | 1/1979 | Amuchastegui |
| 4,147,107 A | 4/1979 | Ringdal |
| 4,157,684 A | 6/1979 | Clausser |
| 4,173,186 A | 11/1979 | Dunham |
| 4,179,992 A | 12/1979 | Ramnarace et al. |
| 4,187,271 A | 2/1980 | Rolston et al. |
| 4,228,724 A | 10/1980 | Leich |
| 4,276,830 A | 7/1981 | Alice |
| 4,353,304 A | 10/1982 | Hubsch et al. |
| 4,475,435 A | 10/1984 | Mantel |
| 4,483,251 A | 11/1984 | Spalding |
| 4,598,445 A | 7/1986 | O'Connor |
| 4,614,157 A | 9/1986 | Grelle et al. |
| 4,679,505 A | 7/1987 | Reed |
| 4,718,348 A | 1/1988 | Ferrigno |
| 4,719,859 A | 1/1988 | Ballreich et al. |
| 4,726,296 A | 2/1988 | Leshner et al. |
| 4,763,576 A | 8/1988 | Kass et al. |
| 4,867,065 A | 9/1989 | Kaltmann et al. |
| 4,970,959 A | 11/1990 | Bilsbury et al. |
| 5,021,206 A | 6/1991 | Stoops |
| 5,033,386 A | 7/1991 | Vatsvog |
| 5,063,853 A | 11/1991 | Bilgeri |
| 5,090,327 A | 2/1992 | Bilgeri |
| 5,151,555 A | 9/1992 | Vatsvog |
| 5,165,040 A | 11/1992 | Andersson et al. |
| 5,237,930 A | 8/1993 | Belanger et al. |
| 5,247,888 A | 9/1993 | Conil |
| 5,259,288 A | 11/1993 | Vatsvog |
| 5,265,540 A | 11/1993 | Ducros et al. |
| D345,676 S | 4/1994 | Biffle |
| 5,433,148 A | 7/1995 | Barratault et al. |
| 5,535,495 A | 7/1996 | Gutowski |
| 5,563,365 A | 10/1996 | Dineen et al. |
| 5,616,642 A | 4/1997 | West et al. |
| D380,650 S | 7/1997 | Norris |
| 5,679,920 A | 10/1997 | Hallis et al. |
| 5,758,445 A | 6/1998 | Casull |
| 5,770,815 A | 6/1998 | Watson |
| 5,798,478 A | 8/1998 | Beal |
| 5,950,063 A | 9/1999 | Hens et al. |
| 5,961,200 A | 10/1999 | Friis |
| 5,969,288 A | 10/1999 | Baud |
| 5,979,331 A | 11/1999 | Casull |
| 6,004,682 A | 12/1999 | Rackovan et al. |
| 6,048,379 A | 4/2000 | Bray et al. |
| 6,070,532 A | 6/2000 | Halverson |
| D435,626 S | 12/2000 | Benini |
| 6,257,148 B1 | 7/2001 | Toivonen et al. |
| 6,257,149 B1 | 7/2001 | Cesaroni |
| D447,209 S | 8/2001 | Benini |
| 6,272,993 B1 | 8/2001 | Cook et al. |
| 6,283,035 B1 | 9/2001 | Olson et al. |
| 6,357,357 B1 | 3/2002 | Glasser |
| D455,052 S | 4/2002 | Gullickson et al. |
| D455,320 S | 4/2002 | Edelstein |
| 6,375,971 B1 | 4/2002 | Hansen |
| 6,408,764 B1 | 6/2002 | Heitmann et al. |
| 6,450,099 B1 | 9/2002 | Desgland |
| 6,460,464 B1 | 10/2002 | Attarwala |
| 6,523,476 B1 | 2/2003 | Riess et al. |
| 6,644,204 B2 | 11/2003 | Pierrot et al. |

(56) References Cited

U.S. PATENT DOCUMENTS

| | | | |
|---|---|---|---|
| 6,649,095 | B2 | 11/2003 | Buja |
| 6,672,219 | B2 | 1/2004 | Mackerell et al. |
| 6,708,621 | B1 | 3/2004 | Forichon-Chaumet et al. |
| 6,752,084 | B1 | 6/2004 | Husseini et al. |
| 6,796,243 | B2 | 9/2004 | Schmees et al. |
| 6,810,816 | B2 | 11/2004 | Rennard |
| 6,840,149 | B2 | 1/2005 | Beal |
| 6,845,716 | B2 | 1/2005 | Husseini et al. |
| 7,000,547 | B2 | 2/2006 | Amick |
| 7,014,284 | B2 | 3/2006 | Morton et al. |
| 7,032,492 | B2 | 4/2006 | Meshirer |
| 7,056,091 | B2 | 6/2006 | Powers |
| 7,059,234 | B2 | 6/2006 | Husseini |
| 7,159,519 | B2 | 1/2007 | Robinson et al. |
| 7,165,496 | B2 | 1/2007 | Reynolds |
| D540,710 | S | 4/2007 | Charrin |
| 7,204,191 | B2 * | 4/2007 | Wiley .................... B29C 65/02 102/517 |
| 7,213,519 | B2 | 5/2007 | Wiley et al. |
| 7,231,519 | B2 | 6/2007 | Joseph et al. |
| 7,232,473 | B2 | 6/2007 | Elliott |
| 7,299,750 | B2 | 11/2007 | Schikora et al. |
| 7,353,756 | B2 * | 4/2008 | LeaSure ................. F42B 12/34 102/506 |
| 7,380,505 | B1 | 6/2008 | Shiery |
| 7,383,776 | B2 | 6/2008 | Amick |
| 7,392,746 | B2 | 7/2008 | Hansen |
| 7,426,888 | B2 | 9/2008 | Hunt |
| 7,441,504 | B2 | 10/2008 | Husseini et al. |
| D583,927 | S | 12/2008 | Benner |
| 7,458,322 | B2 | 12/2008 | Reynolds et al. |
| 7,461,597 | B2 | 12/2008 | Brunn |
| 7,568,417 | B1 | 8/2009 | Lee |
| 7,585,166 | B2 | 9/2009 | Buja |
| 7,610,858 | B2 | 11/2009 | Chung |
| 7,750,091 | B2 | 7/2010 | Maljkovic et al. |
| D626,619 | S | 11/2010 | Gogol et al. |
| 7,841,279 | B2 | 11/2010 | Reynolds et al. |
| D631,699 | S | 2/2011 | Moreau |
| D633,166 | S | 2/2011 | Richardson et al. |
| 7,908,972 | B2 | 3/2011 | Brunn |
| 7,930,977 | B2 | 4/2011 | Klein |
| 8,007,370 | B2 | 8/2011 | Hirsch et al. |
| 8,056,232 | B2 | 11/2011 | Patel et al. |
| 8,156,870 | B2 | 4/2012 | South |
| 8,186,273 | B2 | 5/2012 | Trivette |
| 8,191,480 | B2 | 6/2012 | Mcaninch |
| 8,201,867 | B2 | 6/2012 | Thomeczek |
| 8,206,522 | B2 | 6/2012 | Sandstrom et al. |
| 8,220,393 | B2 | 7/2012 | Schluckebier et al. |
| 8,240,252 | B2 | 8/2012 | Maljkovic et al. |
| 8,347,788 | B1 * | 1/2013 | LeaSure ................. F42B 12/34 102/506 |
| D675,882 | S | 2/2013 | Crockett |
| 8,393,273 | B2 | 3/2013 | Weeks et al. |
| 8,408,137 | B2 | 4/2013 | Battaglia |
| D683,419 | S | 5/2013 | Rebar |
| 8,443,729 | B2 | 5/2013 | Mittelstaedt |
| 8,443,730 | B2 | 5/2013 | Padgett |
| 8,464,641 | B2 | 6/2013 | Se-Hong |
| 8,511,233 | B2 | 8/2013 | Nilsson |
| D689,975 | S | 9/2013 | Carlson et al. |
| 8,522,684 | B2 | 9/2013 | Davies et al. |
| 8,540,828 | B2 | 9/2013 | Busky et al. |
| 8,561,543 | B2 | 10/2013 | Burrow |
| 8,573,126 | B2 | 11/2013 | Klein et al. |
| 8,641,842 | B2 | 2/2014 | Hafner et al. |
| 8,689,696 | B1 | 4/2014 | Seeman et al. |
| 8,763,535 | B2 | 7/2014 | Padgett |
| 8,790,455 | B2 | 7/2014 | Borissov et al. |
| 8,807,008 | B2 | 8/2014 | Padgett et al. |
| 8,807,040 | B2 | 8/2014 | Menefee, III |
| 8,813,650 | B2 | 8/2014 | Maljkovic et al. |
| D715,888 | S | 10/2014 | Padgett |
| 8,850,985 | B2 | 10/2014 | Maljkovic et al. |
| 8,857,343 | B2 | 10/2014 | Marx |
| 8,869,702 | B2 | 10/2014 | Padgett |
| D717,909 | S | 11/2014 | Thrift et al. |
| 8,875,633 | B2 | 11/2014 | Padgett |
| 8,893,621 | B1 | 11/2014 | Escobar |
| 8,915,191 | B2 | 12/2014 | Jones |
| 8,978,559 | B2 | 3/2015 | Davies et al. |
| 8,985,023 | B2 | 3/2015 | Mason |
| 9,003,973 | B1 | 4/2015 | Padgett |
| 9,032,855 | B1 | 5/2015 | Foren et al. |
| 9,091,516 | B2 | 7/2015 | Davies et al. |
| 9,103,641 | B2 | 8/2015 | Nielson et al. |
| 9,111,177 | B2 | 8/2015 | Tateno et al. |
| 9,157,709 | B2 | 10/2015 | Nuetzman et al. |
| 9,170,080 | B2 | 10/2015 | Poore et al. |
| 9,182,204 | B2 | 11/2015 | Maljkovic et al. |
| 9,188,412 | B2 | 11/2015 | Maljkovic et al. |
| 9,200,157 | B2 | 12/2015 | El-Hibri et al. |
| 9,200,878 | B2 | 12/2015 | Seecamp |
| 9,200,880 | B1 | 12/2015 | Foren et al. |
| 9,212,876 | B1 | 12/2015 | Kostka et al. |
| 9,212,879 | B2 | 12/2015 | Whitworth |
| 9,213,175 | B2 | 12/2015 | Arnold |
| 9,254,503 | B2 | 2/2016 | Ward |
| 9,255,775 | B1 | 2/2016 | Rubin |
| D752,397 | S | 3/2016 | Seiders et al. |
| 9,273,941 | B2 | 3/2016 | Carlson et al. |
| D754,223 | S | 4/2016 | Pederson et al. |
| 9,329,004 | B2 | 5/2016 | Pace |
| 9,335,137 | B2 | 5/2016 | Maljkovic et al. |
| 9,337,278 | B1 | 5/2016 | Gu et al. |
| 9,347,457 | B2 | 5/2016 | Ahrens et al. |
| 9,366,512 | B2 | 6/2016 | Burczynski et al. |
| 9,372,054 | B2 | 6/2016 | Padgett |
| 9,377,278 | B2 | 6/2016 | Rubin |
| 9,389,052 | B2 | 7/2016 | Conroy et al. |
| 9,395,165 | B2 | 7/2016 | Maljkovic et al. |
| D764,624 | S | 8/2016 | Masinelli |
| D765,214 | S | 8/2016 | Padgett |
| 9,429,407 | B2 | 8/2016 | Burrow |
| 9,441,930 | B2 | 9/2016 | Burrow |
| 9,453,714 | B2 | 9/2016 | Bosarge et al. |
| D773,009 | S | 11/2016 | Bowers |
| 9,500,453 | B2 | 11/2016 | Schluckebier et al. |
| 9,506,735 | B1 | 11/2016 | Burrow |
| D774,824 | S | 12/2016 | Gallagher |
| 9,513,092 | B2 | 12/2016 | Emary |
| 9,513,096 | B2 | 12/2016 | Burrow |
| 9,518,810 | B1 | 12/2016 | Burrow |
| 9,523,563 | B1 | 12/2016 | Burrow |
| 9,528,799 | B2 | 12/2016 | Maljkovic |
| 9,546,849 | B2 | 1/2017 | Burrow |
| 9,551,557 | B1 | 1/2017 | Burrow |
| D778,391 | S | 2/2017 | Burrow |
| D778,393 | S | 2/2017 | Burrow |
| D778,394 | S | 2/2017 | Burrow |
| D778,395 | S | 2/2017 | Burrow |
| D779,021 | S | 2/2017 | Burrow |
| D779,024 | S | 2/2017 | Burrow |
| D780,283 | S | 2/2017 | Burrow |
| 9,587,918 | B1 * | 3/2017 | Burrow .................. F42B 12/78 |
| 9,599,443 | B2 | 3/2017 | Padgett et al. |
| 9,625,241 | B2 | 4/2017 | Neugebauer |
| 9,631,907 | B2 | 4/2017 | Burrow |
| 9,644,930 | B1 | 5/2017 | Burrow |
| 9,658,042 | B2 | 5/2017 | Emary |
| 9,683,818 | B2 | 6/2017 | Lemke et al. |
| D792,200 | S | 7/2017 | Baiz et al. |
| 9,709,368 | B2 | 7/2017 | Mahnke |
| D797,880 | S | 9/2017 | Seecamp |
| 9,759,554 | B2 | 9/2017 | Ng et al. |
| D800,244 | S | 10/2017 | Burczynski et al. |
| D800,245 | S | 10/2017 | Burczynski et al. |
| D800,246 | S | 10/2017 | Burczynski et al. |
| 9,784,667 | B2 | 10/2017 | Lukay et al. |
| 9,835,423 | B2 | 12/2017 | Burrow |
| 9,835,427 | B2 | 12/2017 | Burrow |
| 9,857,151 | B2 | 1/2018 | Dionne et al. |
| 9,869,536 | B2 | 1/2018 | Burrow |

(56) References Cited

U.S. PATENT DOCUMENTS

| | | |
|---|---|---|
| 9,879,954 B2 | 1/2018 | Hajar |
| 9,885,551 B2 | 2/2018 | Burrow |
| D813,975 S | 3/2018 | White |
| 9,921,040 B2 | 3/2018 | Rubin |
| 9,927,219 B2 | 3/2018 | Burrow |
| 9,933,241 B2 | 4/2018 | Burrow |
| 9,939,236 B2 | 4/2018 | Drobockyi et al. |
| 9,964,388 B1 | 5/2018 | Burrow |
| D821,536 S | 6/2018 | Christiansen et al. |
| 9,989,339 B2 | 6/2018 | Riess |
| 9,989,343 B2 | 6/2018 | Padgett et al. |
| 10,041,770 B2 | 8/2018 | Burrow |
| 10,041,771 B1 | 8/2018 | Burrow |
| 10,041,776 B1 | 8/2018 | Burrow |
| 10,041,777 B1 | 8/2018 | Burrow |
| 10,048,049 B2 | 8/2018 | Burrow |
| 10,048,050 B1 | 8/2018 | Burrow |
| 10,048,052 B2 | 8/2018 | Burrow |
| 10,054,413 B1 | 8/2018 | Burrow |
| D828,483 S | 9/2018 | Burrow |
| 10,081,057 B2 * | 9/2018 | Burrow ............... B22F 1/0062 |
| D832,037 S | 10/2018 | Gallagher |
| 10,101,140 B2 | 10/2018 | Burrow |
| 10,124,343 B2 | 11/2018 | Tsai |
| 10,145,662 B2 | 12/2018 | Burrow |
| 10,190,857 B2 | 1/2019 | Burrow |
| 10,234,249 B2 | 3/2019 | Burrow |
| 10,234,253 B2 | 3/2019 | Burrow |
| 10,240,905 B2 | 3/2019 | Burrow |
| 10,254,096 B2 | 4/2019 | Burrow |
| 10,260,847 B2 | 4/2019 | Viggiano et al. |
| D849,181 S | 5/2019 | Burrow |
| 10,302,403 B2 | 5/2019 | Burrow |
| 10,302,404 B2 | 5/2019 | Burrow |
| 10,323,918 B2 | 6/2019 | Menefee, III |
| 10,330,451 B2 | 6/2019 | Burrow |
| 10,345,088 B2 | 7/2019 | Burrow |
| 10,352,664 B2 | 7/2019 | Burrow |
| 10,352,670 B2 | 7/2019 | Burrow |
| 10,359,262 B2 | 7/2019 | Burrow |
| 10,365,074 B2 | 7/2019 | Burrow |
| D861,118 S | 9/2019 | Burrow |
| D861,119 S | 9/2019 | Burrow |
| 10,408,582 B2 | 9/2019 | Burrow |
| 10,408,592 B2 | 9/2019 | Boss et al. |
| 10,415,943 B2 | 9/2019 | Burrow |
| 10,429,156 B2 | 10/2019 | Burrow |
| 10,458,762 B2 | 10/2019 | Burrow |
| 10,466,020 B2 | 11/2019 | Burrow |
| 10,466,021 B2 | 11/2019 | Burrow |
| 10,480,911 B2 | 11/2019 | Burrow |
| 10,480,912 B2 | 11/2019 | Burrow |
| 10,480,915 B2 | 11/2019 | Burrow et al. |
| 10,488,165 B2 | 11/2019 | Burrow |
| 10,533,830 B2 | 1/2020 | Burrow et al. |
| 10,571,228 B2 | 2/2020 | Burrow |
| 10,571,229 B2 | 2/2020 | Burrow |
| 10,571,230 B2 | 2/2020 | Burrow |
| 10,571,231 B2 | 2/2020 | Burrow |
| 10,578,409 B2 | 3/2020 | Burrow |
| 10,591,260 B2 * | 3/2020 | Burrow ............... F42C 19/083 |
| D882,019 S | 4/2020 | Burrow et al. |
| D882,020 S | 4/2020 | Burrow et al. |
| D882,021 S | 4/2020 | Burrow et al. |
| D882,022 S | 4/2020 | Burrow et al. |
| D882,023 S | 4/2020 | Burrow et al. |
| D882,024 S | 4/2020 | Burrow et al. |
| D882,025 S | 4/2020 | Burrow et al. |
| D882,026 S | 4/2020 | Burrow et al. |
| D882,027 S | 4/2020 | Burrow et al. |
| D882,028 S | 4/2020 | Burrow et al. |
| D882,029 S | 4/2020 | Burrow et al. |
| D882,030 S | 4/2020 | Burrow et al. |
| D882,031 S | 4/2020 | Burrow et al. |
| D882,032 S | 4/2020 | Burrow et al. |
| D882,033 S | 4/2020 | Burrow et al. |
| D882,720 S | 4/2020 | Burrow et al. |
| D882,721 S | 4/2020 | Burrow et al. |
| D882,722 S | 4/2020 | Burrow et al. |
| D882,723 S | 4/2020 | Burrow et al. |
| D882,724 S | 4/2020 | Burrow et al. |
| 10,612,896 B2 | 4/2020 | Burrow |
| 10,612,897 B2 | 4/2020 | Burrow et al. |
| D884,115 S | 5/2020 | Burrow et al. |
| 10,663,271 B2 | 5/2020 | Rogers |
| D886,231 S | 6/2020 | Burrow et al. |
| D886,937 S | 6/2020 | Burrow et al. |
| 10,677,573 B2 | 6/2020 | Burrow et al. |
| D891,567 S | 7/2020 | Burrow et al. |
| D891,568 S | 7/2020 | Burrow et al. |
| D891,569 S | 7/2020 | Burrow et al. |
| D891,570 S | 7/2020 | Burrow et al. |
| 10,704,869 B2 | 7/2020 | Burrow et al. |
| 10,704,870 B2 | 7/2020 | Burrow et al. |
| 10,704,871 B2 | 7/2020 | Burrow et al. |
| 10,704,872 B1 | 7/2020 | Burrow et al. |
| 10,704,876 B2 | 7/2020 | Boss et al. |
| 10,704,877 B2 | 7/2020 | Boss et al. |
| 10,704,878 B2 | 7/2020 | Boss et al. |
| 10,704,879 B1 | 7/2020 | Burrow et al. |
| 10,704,880 B1 | 7/2020 | Burrow et al. |
| D892,258 S | 8/2020 | Burrow et al. |
| D893,665 S | 8/2020 | Burrow et al. |
| D893,666 S | 8/2020 | Burrow et al. |
| D893,667 S | 8/2020 | Burrow et al. |
| D893,668 S | 8/2020 | Burrow et al. |
| D894,320 S | 8/2020 | Burrow et al. |
| 10,731,956 B2 | 8/2020 | Burrow et al. |
| 10,731,957 B1 | 8/2020 | Burrow et al. |
| 10,753,713 B2 | 8/2020 | Burrow |
| 10,760,882 B1 | 9/2020 | Burrow |
| 10,782,107 B1 | 9/2020 | Dindl |
| 10,794,671 B2 | 10/2020 | Padgett et al. |
| 10,809,043 B2 | 10/2020 | Padgett et al. |
| D903,038 S | 11/2020 | Burrow et al. |
| D903,039 S | 11/2020 | Burrow et al. |
| 10,845,169 B2 | 11/2020 | Burrow |
| 10,852,108 B2 | 12/2020 | Burrow et al. |
| 10,859,352 B2 | 12/2020 | Burrow |
| 10,871,361 B2 | 12/2020 | Skowron et al. |
| 10,876,822 B2 | 12/2020 | Burrow et al. |
| 10,900,760 B2 | 1/2021 | Burrow |
| 10,907,944 B2 | 2/2021 | Burrow |
| 10,914,558 B2 | 2/2021 | Burrow |
| 10,921,100 B2 * | 2/2021 | Burrow ............... F42B 5/307 |
| 10,921,101 B2 | 2/2021 | Burrow et al. |
| 10,921,106 B2 | 2/2021 | Burrow et al. |
| D913,403 S | 3/2021 | Burrow et al. |
| 10,948,272 B1 | 3/2021 | Drobockyi et al. |
| 10,948,273 B2 | 3/2021 | Burrow et al. |
| 10,948,275 B2 | 3/2021 | Burrow |
| 10,962,338 B2 | 3/2021 | Burrow |
| 10,976,144 B1 | 4/2021 | Peterson et al. |
| 10,996,029 B2 | 5/2021 | Burrow |
| 10,996,030 B2 | 5/2021 | Burrow |
| 2003/0127011 A1 | 7/2003 | Mackerell et al. |
| 2004/0074412 A1 | 4/2004 | Kightlinger |
| 2004/0200340 A1 | 10/2004 | Robinson et al. |
| 2005/0056183 A1 | 3/2005 | Meshirer |
| 2005/0081704 A1 | 4/2005 | Husseini |
| 2005/0257712 A1 | 11/2005 | Husseini et al. |
| 2006/0027125 A1 | 2/2006 | Brunn |
| 2006/0278116 A1 | 12/2006 | Hunt |
| 2006/0283345 A1 | 12/2006 | Feldman et al. |
| 2007/0056343 A1 | 3/2007 | Cremonesi |
| 2007/0181029 A1 | 8/2007 | Mcaninch |
| 2007/0214992 A1 | 9/2007 | Dittrich |
| 2007/0214993 A1 | 9/2007 | Cerovic et al. |
| 2007/0267587 A1 | 11/2007 | Dalluge |
| 2010/0101444 A1 | 4/2010 | Schluckebier et al. |
| 2010/0212533 A1 | 8/2010 | Brunn |
| 2010/0234132 A1 | 9/2010 | Hirsch et al. |
| 2010/0258023 A1 | 10/2010 | Reynolds et al. |
| 2010/0282112 A1 | 11/2010 | Battaglia |

(56) References Cited

U.S. PATENT DOCUMENTS

| | | |
|---|---|---|
| 2011/0179965 A1 | 7/2011 | Mason |
| 2012/0024183 A1 | 2/2012 | Klein |
| 2012/0111219 A1 | 5/2012 | Burrow |
| 2012/0180685 A1 | 7/2012 | Se-Hong |
| 2012/0180687 A1 | 7/2012 | Padgett et al. |
| 2012/0291655 A1 | 11/2012 | Jones |
| 2013/0008335 A1 | 1/2013 | Menefee |
| 2013/0014664 A1 | 1/2013 | Padgett |
| 2013/0076865 A1 | 3/2013 | Tateno et al. |
| 2013/0186294 A1 | 7/2013 | Davies et al. |
| 2013/0291711 A1 | 11/2013 | Mason |
| 2014/0224144 A1 | 8/2014 | Neugebauer |
| 2014/0260925 A1 | 9/2014 | Beach et al. |
| 2014/0261044 A1 | 9/2014 | Seecamp |
| 2014/0311332 A1 | 10/2014 | Carlson et al. |
| 2015/0075400 A1 | 3/2015 | Lemke et al. |
| 2015/0226220 A1 | 8/2015 | Bevington |
| 2015/0268020 A1 | 9/2015 | Emary |
| 2016/0003585 A1 | 1/2016 | Carpenter et al. |
| 2016/0003589 A1 | 1/2016 | Burrow |
| 2016/0003590 A1 | 1/2016 | Burrow |
| 2016/0003593 A1 | 1/2016 | Burrow |
| 2016/0003594 A1 | 1/2016 | Burrow |
| 2016/0003595 A1 | 1/2016 | Burrow |
| 2016/0003596 A1 | 1/2016 | Burrow |
| 2016/0003597 A1 | 1/2016 | Burrow |
| 2016/0003601 A1 | 1/2016 | Burrow |
| 2016/0033241 A1 | 2/2016 | Burrow |
| 2016/0102030 A1 | 4/2016 | Coffey et al. |
| 2016/0146585 A1 | 5/2016 | Padgett |
| 2016/0216088 A1 | 7/2016 | Maljkovic et al. |
| 2016/0245626 A1 | 8/2016 | Drieling et al. |
| 2016/0265886 A1 | 9/2016 | Aldrich et al. |
| 2016/0349022 A1 | 12/2016 | Burrow |
| 2016/0349023 A1 | 12/2016 | Burrow |
| 2016/0349028 A1 | 12/2016 | Burrow |
| 2016/0356588 A1 | 12/2016 | Burrow |
| 2016/0377399 A1 | 12/2016 | Burrow |
| 2017/0030690 A1 | 2/2017 | Viggiano et al. |
| 2017/0030692 A1 | 2/2017 | Drobockyi et al. |
| 2017/0080498 A1 | 3/2017 | Burrow |
| 2017/0082409 A1 | 3/2017 | Burrow |
| 2017/0082411 A1 | 3/2017 | Burrow |
| 2017/0089673 A1 | 3/2017 | Burrow |
| 2017/0089674 A1 | 3/2017 | Burrow |
| 2017/0089675 A1 | 3/2017 | Burrow |
| 2017/0089679 A1 | 3/2017 | Burrow |
| 2017/0115105 A1 | 4/2017 | Burrow |
| 2017/0153093 A9 | 6/2017 | Burrow |
| 2017/0153099 A9 | 6/2017 | Burrow |
| 2017/0191812 A1 | 7/2017 | Padgett et al. |
| 2017/0199018 A9 | 7/2017 | Burrow |
| 2017/0205217 A9 | 7/2017 | Burrow |
| 2017/0261296 A1 | 9/2017 | Burrow |
| 2017/0299352 A9 | 10/2017 | Burrow |
| 2017/0328689 A1 | 11/2017 | Dindl |
| 2018/0066925 A1 | 3/2018 | Skowron et al. |
| 2018/0106581 A1 | 4/2018 | Rogers |
| 2018/0224252 A1 | 8/2018 | O'Rourke |
| 2018/0224253 A1 | 8/2018 | Burrow |
| 2018/0224256 A1 | 8/2018 | Burrow |
| 2018/0259310 A1 | 9/2018 | Burrow |
| 2018/0292186 A1 | 10/2018 | Padgett et al. |
| 2018/0306558 A1 | 10/2018 | Padgett et al. |
| 2019/0011233 A1 | 1/2019 | Boss et al. |
| 2019/0011234 A1 | 1/2019 | Boss et al. |
| 2019/0011235 A1 | 1/2019 | Boss et al. |
| 2019/0011236 A1 | 1/2019 | Burrow |
| 2019/0011237 A1 | 1/2019 | Burrow |
| 2019/0011238 A1 | 1/2019 | Burrow |
| 2019/0011239 A1 | 1/2019 | Burrow |
| 2019/0011240 A1 | 1/2019 | Burrow |
| 2019/0011241 A1 | 1/2019 | Burrow |
| 2019/0025019 A1 | 1/2019 | Burrow |
| 2019/0025020 A1 | 1/2019 | Burrow |
| 2019/0025021 A1 | 1/2019 | Burrow |
| 2019/0025022 A1 | 1/2019 | Burrow |
| 2019/0025023 A1 | 1/2019 | Burrow |
| 2019/0025024 A1 | 1/2019 | Burrow |
| 2019/0025025 A1 | 1/2019 | Burrow |
| 2019/0025026 A1 | 1/2019 | Burrow |
| 2019/0025035 A1 | 1/2019 | Burrow |
| 2019/0078862 A1 | 3/2019 | Burrow |
| 2019/0106364 A1 | 4/2019 | James |
| 2019/0107375 A1 | 4/2019 | Burrow |
| 2019/0137228 A1 | 5/2019 | Burrow et al. |
| 2019/0137229 A1 | 5/2019 | Burrow et al. |
| 2019/0137230 A1 | 5/2019 | Burrow et al. |
| 2019/0137231 A1 | 5/2019 | Burrow et al. |
| 2019/0137233 A1 | 5/2019 | Burrow et al. |
| 2019/0137234 A1 | 5/2019 | Burrow et al. |
| 2019/0137235 A1 | 5/2019 | Burrow et al. |
| 2019/0137236 A1 | 5/2019 | Burrow et al. |
| 2019/0137237 A1 | 5/2019 | Burrow et al. |
| 2019/0137238 A1 | 5/2019 | Burrow et al. |
| 2019/0137239 A1 | 5/2019 | Burrow et al. |
| 2019/0137240 A1 | 5/2019 | Burrow et al. |
| 2019/0137241 A1 | 5/2019 | Burrow et al. |
| 2019/0137242 A1 | 5/2019 | Burrow et al. |
| 2019/0137243 A1 | 5/2019 | Burrow et al. |
| 2019/0137244 A1 | 5/2019 | Burrow et al. |
| 2019/0170488 A1 | 6/2019 | Burrow |
| 2019/0204050 A1 | 7/2019 | Burrow |
| 2019/0204056 A1 | 7/2019 | Burrow |
| 2019/0212117 A1 | 7/2019 | Burrow |
| 2019/0242679 A1 | 8/2019 | Viggiano et al. |
| 2019/0242682 A1 | 8/2019 | Burrow |
| 2019/0242683 A1 | 8/2019 | Burrow |
| 2019/0249967 A1 | 8/2019 | Burrow et al. |
| 2019/0257625 A1 | 8/2019 | Burrow |
| 2019/0310058 A1 | 10/2019 | Burrow |
| 2019/0310059 A1 | 10/2019 | Burrow |
| 2019/0316886 A1 | 10/2019 | Burrow |
| 2019/0360788 A1 | 11/2019 | Burrow |
| 2019/0376773 A1 | 12/2019 | Burrow |
| 2019/0376774 A1 | 12/2019 | Boss et al. |
| 2019/0383590 A1 | 12/2019 | Burrow |
| 2020/0011645 A1 | 1/2020 | Burrow et al. |
| 2020/0011646 A1 | 1/2020 | Burrow et al. |
| 2020/0025536 A1 | 1/2020 | Burrow et al. |
| 2020/0025537 A1 | 1/2020 | Burrow et al. |
| 2020/0033102 A1 | 1/2020 | Burrow |
| 2020/0033103 A1 | 1/2020 | Burrow et al. |
| 2020/0041239 A1 | 2/2020 | Burrow |
| 2020/0049469 A1 | 2/2020 | Burrow |
| 2020/0049470 A1 | 2/2020 | Burrow |
| 2020/0049471 A1 | 2/2020 | Burrow |
| 2020/0049472 A1 | 2/2020 | Burrow |
| 2020/0049473 A1 | 2/2020 | Burrow |
| 2020/0056872 A1 | 2/2020 | Burrow |
| 2020/0109932 A1 | 4/2020 | Burrow |
| 2020/0149853 A1 | 5/2020 | Burrow |
| 2020/0158483 A1 | 5/2020 | Burrow |
| 2020/0200512 A1 | 6/2020 | Burrow |
| 2020/0200513 A1 | 6/2020 | Burrow |
| 2020/0208948 A1 | 7/2020 | Burrow |
| 2020/0208949 A1 | 7/2020 | Burrow |
| 2020/0208950 A1 | 7/2020 | Burrow |
| 2020/0225009 A1 | 7/2020 | Burrow |
| 2020/0248998 A1 | 8/2020 | Burrow |
| 2020/0248999 A1 | 8/2020 | Burrow |
| 2020/0249000 A1 | 8/2020 | Burrow |
| 2020/0263962 A1 | 8/2020 | Burrow et al. |
| 2020/0263967 A1 | 8/2020 | Burrow et al. |
| 2020/0278183 A1 | 9/2020 | Burrow et al. |
| 2020/0292283 A1 | 9/2020 | Burrow |
| 2020/0300587 A1 | 9/2020 | Burrow et al. |
| 2020/0300592 A1 | 9/2020 | Overton et al. |
| 2020/0309490 A1 | 10/2020 | Burrow et al. |
| 2020/0309496 A1 | 10/2020 | Burrow et al. |
| 2020/0326168 A1 | 10/2020 | Boss et al. |
| 2020/0363172 A1 | 11/2020 | Koh et al. |
| 2020/0363173 A1 | 11/2020 | Burrow |
| 2020/0363179 A1 | 11/2020 | Overton et al. |

(56) References Cited

U.S. PATENT DOCUMENTS

| | | |
|---|---|---|
| 2020/0378734 A1 | 12/2020 | Burrow |
| 2020/0393220 A1 | 12/2020 | Burrow |
| 2020/0400411 A9 | 12/2020 | Burrow |
| 2021/0003373 A1 | 1/2021 | Burrow |
| 2021/0041211 A1 | 2/2021 | Pennell et al. |
| 2021/0041212 A1 | 2/2021 | Burrow et al. |
| 2021/0041213 A1 | 2/2021 | Padgett |
| 2021/0072006 A1 | 3/2021 | Padgett et al. |
| 2021/0080236 A1 | 3/2021 | Burrow |
| 2021/0080237 A1 | 3/2021 | Burrow et al. |
| 2021/0108898 A1 | 4/2021 | Overton et al. |
| 2021/0108899 A1 | 4/2021 | Burrow et al. |
| 2021/0123709 A1 | 4/2021 | Burrow et al. |
| 2021/0131772 A1 | 5/2021 | Burrow |
| 2021/0131773 A1 | 5/2021 | Burrow |
| 2021/0131774 A1 | 5/2021 | Burrow |
| 2021/0140749 A1 | 5/2021 | Burrow |

FOREIGN PATENT DOCUMENTS

| | | |
|---|---|---|
| DE | 16742 C | 1/1882 |
| EP | 2625486 A4 | 8/2017 |
| FR | 1412414 A | 10/1965 |
| GB | 783023 A | 9/1957 |
| RU | 2172467 C1 | 8/2001 |
| WO | 0034732 | 6/2000 |
| WO | 2007014024 A2 | 2/2007 |
| WO | 2012047615 A1 | 4/2012 |
| WO | 2012097320 A1 | 7/2012 |
| WO | 2012097317 A3 | 11/2012 |
| WO | 2013070250 A1 | 5/2013 |
| WO | 2013096848 A1 | 6/2013 |
| WO | 2014062256 A2 | 4/2014 |
| WO | 2016003817 A1 | 1/2016 |
| WO | 2019094544 A1 | 5/2019 |
| WO | 2019160742 A2 | 8/2019 |
| WO | 2021040903 A2 | 3/2021 |

OTHER PUBLICATIONS

IPRP in PCT2019017085 dated Aug. 27, 2020, pp. 1-8.
AccurateShooter.com Daily Bulletin "New PolyCase Ammunition and Injection-Molded Bullets" Jan. 11, 2015.
International Ammunition Association, Inc. website, published on Apr. 2017, PCP Ammo Variation in U.S. Military Polymer/Metal Cartridge Case R&D, Available on the Internet URL https://forum.cartridgecollectors.org/t/pcp-ammo-variation-in-u-s-military-polyer-metal-cartridge-case-r-d/24400.
International Preliminary Report on Patentability and Written Opinion in PCT/US2018/059748 dated May 12, 2020; pp. 1-8.
International Search Report and Written Opinion for PCTUS201859748 dated Mar. 1, 2019, pp. 1-9.
International Search Report and Written Opinion for PCTUS2019017085 dated Apr. 19, 2019, pp. 1-9.
International Search Report and Written Opinion in PCT/US2019/040323 dated Sep. 24, 2019, pp. 1-16.
International Search Report and Written Opinion in PCT/US2019/040329 dated Sep. 27, 2019, pp. 1-24.
Korean Intellectual Property Office (ISA), International Search Report and Written Opinion for PCT/US2011/062781 dated Nov. 30, 2012, 16 pp.
Korean Intellectual Property Office (ISA), International Search Report and Written Opinion for PCT/US2015/038061 dated Sep. 21, 2015, 28 pages.
ISRWO in PCT/US2020/042258 dated Feb. 19, 2021, pp. 1-12.

* cited by examiner

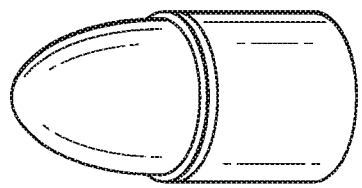
FIG. 20a
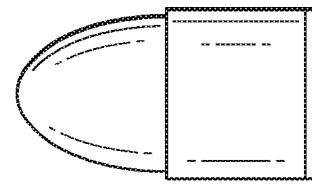
FIG. 20e
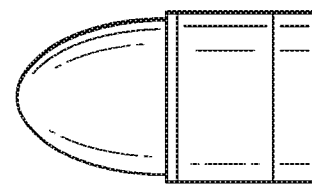
FIG. 20d
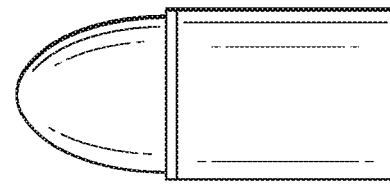
FIG. 20c
FIG. 20b

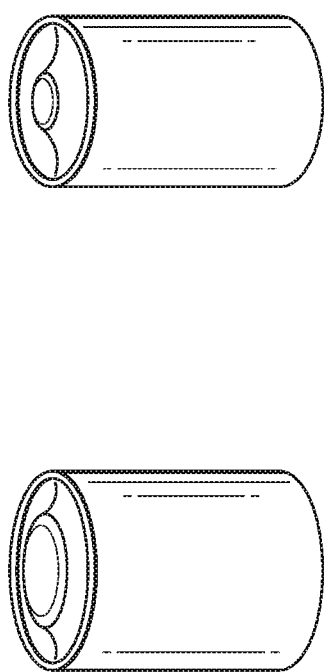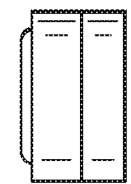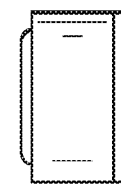

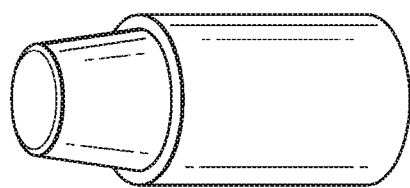
FIG. 20l
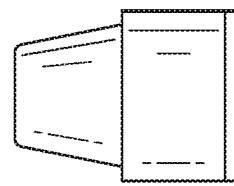
FIG. 20p
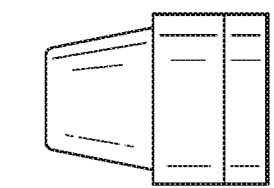
FIG. 20o
FIG. 20n
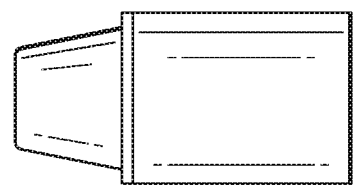
FIG. 20m

METHOD OF MAKING A METAL INJECTION MOLDED AMMUNITION CARTRIDGE

CROSS-REFERENCE TO RELATED APPLICATIONS

This application is a continuation of U.S. patent application Ser. No. 14/863,800 filed Sep. 24, 2015 now U.S. Pat. No. 10,041,770, which is a continuation of U.S. patent application Ser. No. 14/011,202 filed Aug. 27, 2013, now U.S. Pat. No. 9,546,849 issued Jan. 17, 2017, which is a continuation of U.S. patent application Ser. No. 13/292,843 filed Nov. 9, 2011, now U.S. Pat. No. 8,561,543 issued Oct. 22, 2013, and claims the benefit of U.S. Patent Application No. 61/456,664 filed Nov. 10, 2010, all of which are incorporated herein by reference.

TECHNICAL FIELD OF THE INVENTION

The present invention relates in general to the field of ammunition, specifically to compositions of matter and methods of making metal cartridge cases by metal injection molding.

STATEMENT OF FEDERALLY FUNDED RESEARCH

None.

INCORPORATION-BY-REFERENCE OF MATERIALS FILED ON COMPACT DISC

None.

BACKGROUND OF THE INVENTION

Without limiting the scope of the invention, its background is described in connection with projectiles made by injection molding for use in ammunition. Conventional ammunition casings for rifles and machine guns, as well as larger caliber weapons, are made from brass or lead that are machined.

Shortcomings of the known methods of producing ammunition cartridges include the limitation of materials that can be used and the lengthy time for manufacturing.

BRIEF SUMMARY OF THE INVENTION

The present invention provides a method of making a metal injection molded ammunition cartridge comprising the steps of: providing an ammunition cartridge mold comprising a bottom portion having a primer recess extending into the bottom portion adapted to receive a primer, a flash hole positioned in the primer recess through the bottom surface; side walls extending from the bottom portion to a nose end aperture, wherein a propellant chamber is formed between the nose end aperture and the bottom surface; injecting a metal composition into the ammunition cartridge mold to form a metal injection molded ammunition cartridge, wherein the metal composition comprises stainless steel, brass, ceramic alloys, copper/cobalt/nickel/custom alloys, tungsten, tungsten carbide, carballoy, Ferro-tungsten, titanium, copper, cobalt, nickel, uranium, depleted uranium, alumina oxide, zirconia and aluminum; and removing the metal injection molded ammunition cartridge from the ammunition cartridge mold.

The metal injection molded ammunition cartridge method further comprising the step of forming a shoulder in the metal injection molded ammunition cartridge. The metal injection molded ammunition cartridge method further comprising the step of forming a neck between the shoulder and the nose end aperture to form a projectile aperture. The metal composition comprises: a) 2-16% Ni; 10-20% Cr; 0-5% Mo; 0-0.6% C; 0-6.0% Cu; 0-0.5% Nb+Ta; 0-4.0% Mn; 0-2.0% Si and the balance Fe; b) 2-6% Ni; 13.5-19.5% Cr; 0-0.10% C; 1-7.0% Cu; 0.05-0.65% Nb+Ta; 0-3.0% Mn; 0-3.0% Si and the balance Fe; c) 3-5% Ni; 15.5-17.5% Cr; 0-0.07% C; 3-5.0% Cu; 0.15-0.45% Nb+Ta; 0-1.0% Mn; 0-1.0% Si and the balance Fe; d) 10-14% Ni; 16-18% Cr; 2-3% Mo; 0-0.03% C; 0-2% Mn; 0-1% Si and the balance Fe; e) 12-14% Cr; 0.15-0.4% C; 0-1% Mn; 0-1% Si and the balance Fe; f) 16-18% Cr; 0-0.05% C; 0-1% Mn; 0-1% Si and the balance Fe; g) 3-12% aluminum, 2-8% vanadium, 0.1-0.75% iron, 0.1-0.5% oxygen, and the remainder titanium; or h) about 6% aluminum, about 4% vanadium, about 0.25% iron, about 0.2% oxygen, and the remainder titanium. In one embodiment the metal composition comprises 102, 174, 201, 202, 300, 302, 303, 304, 308, 309, 316, 316L, 316Ti, 321, 405, 408, 409, 410, 415, 416, 416R, 420, 430, 439, 440, 446 or 601-665 grade stainless steel. In one embodiment the metal composition comprises 2-16% Ni; 10-20% Cr; 0-5% Mo; 0-0.6% C; 0-6.0% Cu; 0-0.5% Nb+Ta; 0-4.0% Mn; 0-2.0% Si and the balance Fe; 2-6% Ni; 13.5-19.5% Cr; 0-0.10% C; 1-7.0% Cu; 0.05-0.65% Nb+Ta; 0-3.0% Mn; 0-3.0% Si and the balance Fe; 3-5% Ni; 15.5-17.5% Cr; 0-0.07% C; 3-5.0% Cu; 0.15-0.45% Nb+Ta; 0-1.0% Mn; 0-1.0% Si and the balance Fe; 10-14% Ni; 16-18% Cr; 2-3% Mo; 0-0.03% C; 0-2% Mn; 0-1% Si and the balance Fe; 12-14% Cr; 0.15-0.4% C; 0-1% Mn; 0-1% Si and the balance Fe; 16-18% Cr; 0-0.05% C; 0-1% Mn; 0-1% Si and the balance Fe; 3-12% aluminum, 2-8% vanadium, 0.1-0.75% iron, 0.1-0.5% oxygen, and the remainder titanium; or 6% aluminum, about 4% vanadium, about 0.25% iron, about 0.2% oxygen, and the remainder titanium. In one embodiment the metal composition comprises brass or a brass alloy.

The present invention provides a method of making a metal injection molded ammunition cartridge comprising the steps of: providing an ammunition cartridge mold comprising a bottom portion having a primer recess extending into the bottom portion adapted to receive a primer, a flash hole positioned in the primer recess through the bottom surface; side walls extending from the bottom portion to a nose end aperture, wherein a propellant chamber is formed between the nose end aperture and the bottom surface;

injecting a metal composition into the ammunition cartridge mold to form a metal injection molded ammunition cartridge, wherein the metal composition comprises 2-16% Ni; 10-20% Cr; 0-5% Mo; 0-0.6% C; 0-6.0% Cu; 0-0.5% Nb+Ta; 0-4.0% Mn; 0-2.0% Si and the balance Fe; 2-6% Ni; 13.5-19.5% Cr; 0-0.10% C; 1-7.0% Cu; 0.05-0.65% Nb+Ta; 0-3.0% Mn; 0-3.0% Si and the balance Fe; 3-5% Ni; 15.5-17.5% Cr; 0-0.07% C; 3-5.0% Cu; 0.15-0.45% Nb+Ta; 0-1.0% Mn; 0-1.0% Si and the balance Fe; 10-14% Ni; 16-18% Cr; 2-3% Mo; 0-0.03% C; 0-2% Mn; 0-1% Si and the balance Fe; 12-14% Cr; 0.15-0.4% C; 0-1% Mn; 0-1% Si and the balance Fe; 16-18% Cr; 0-0.05% C; 0-1% Mn; 0-1% Si and the balance Fe; 3-12% aluminum, 2-8% vanadium, 0.1-0.75% iron, 0.1-0.5% oxygen, and the remainder titanium; or 6% aluminum, about 4% vanadium, about 0.25% iron, about 0.2% oxygen, and the remainder titanium, and removing the metal injection molded ammunition cartridge from the ammunition cartridge mold.

The present invention provides a method of making a metal injection molded ammunition cartridge comprising the steps of: providing an ammunition cartridge mold comprising a bottom portion having a primer recess extending into the bottom portion adapted to receive a primer, a flash hole positioned in the primer recess through the bottom surface; side walls extending from the bottom portion to a nose end aperture, wherein a propellant chamber is formed between the nose end aperture and the bottom surface; injecting a metal composition into the ammunition cartridge mold to form a metal injection molded ammunition cartridge, wherein the metal composition comprises a) 2-16% Ni; 10-20% Cr; 0-5% Mo; 0-0.6% C; 0-6.0% Cu; 0-0.5% Nb+Ta; 0-4.0% Mn; 0-2.0% Si and the balance Fe; b) 2-6% Ni; 13.5-19.5% Cr; 0-0.10% C; 1-7.0% Cu; 0.05-0.65% Nb+Ta; 0-3.0% Mn; 0-3.0% Si and the balance Fe; c) 3-5% Ni; 15.5-17.5% Cr; 0-0.07% C; 3-5.0% Cu; 0.15-0.45% Nb+Ta; 0-1.0% Mn; 0-1.0% Si and the balance Fe; d) 10-14% Ni; 16-18% Cr; 2-3% Mo; 0-0.03% C; 0-2% Mn; 0-1% Si and the balance Fe; e) 12-14% Cr; 0.15-0.4% C; 0-1% Mn; 0-1% Si and the balance Fe; f) 16-18% Cr; 0-0.05% C; 0-1% Mn; 0-1% Si and the balance Fe; g) 3-12% aluminum, 2-8% vanadium, 0.1-0.75% iron, 0.1-0.5% oxygen, and the remainder titanium; or h) about 6% aluminum, about 4% vanadium, about 0.25% iron, about 0.2% oxygen, and the remainder titanium, and removing the metal injection molded ammunition cartridge from the ammunition cartridge mold.

BRIEF DESCRIPTION OF THE SEVERAL VIEWS OF THE DRAWINGS

For a more complete understanding of the features and advantages of the present invention, reference is now made to the detailed description of the invention along with the accompanying figures and in which.

DETAILED DESCRIPTION OF THE INVENTION

Figure 1A:
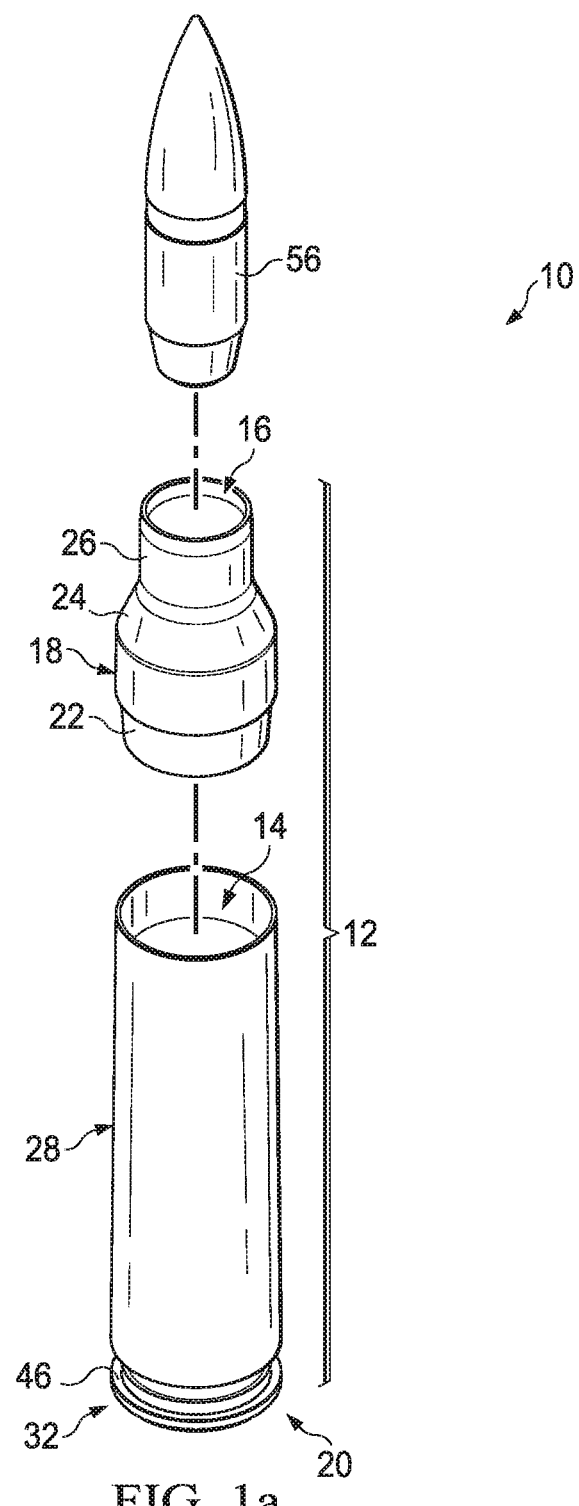
FIG. 1a depicts an exploded view of the polymeric cartridge casing.

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention.

As used herein the term "shell," "bullet" and "projectile" are used interchangeably and denote a projectile that is positioned in an ammunition cartridge until it is expelled from a gun, rifle, or the like and propelled by detonation of a powdered chemical propellant or other propellant that may be non-powdered, solid, gaseous or gelatin. And includes payload-carrying projectiles contains shot, an explosive or other filling, though modern usage sometimes includes large solid projectiles properly termed shot (AP, APCR, APCNR, APDS, APFSDS and proof shot).

As used herein AP denotes Armor Piercing (has a steel or other hard metal core Military); API denotes Armor Piercing Incendiary (Military); APT denotes Armor Piercing Tracer (Military); APTI denotes Armor Piercing Tracer Incendiary (Military); BBWC denotes Bevel Base Wad Cutter; BT denotes Boat Tail; BTBT denotes Ballistic Tip Boat Tail; BTHP denotes Boat Tail Hollow Point; BTSP denotes Boat Tail Soft Point; FEB denotes Fully Encased Bullet; FMC denotes Full Metal Case; FMJ denotes Full Metal Jacket; FMJBT denotes Full Metal Jacket Boat Tail; FMJFN denotes Full Metal Jacket Flat Nose; FMJFP denotes Full Metal Jacket Flat Point; FMJRN denotes Full Metal Jacket Round Nose; FMJRP denotes Full Metal Jacket Round Point; FMJSWC denotes Full Metal Jacket Semi-Wad Cutter; FMJTC denotes Full Metal Jacket Truncated Cone; FN denotes Flat Nose; FNEB denotes Flat Nose Enclosed Base; FNSP denotes Flat Nose Soft Point; FP denotes Flat Point; HE denotes High Energy or high explosive; HP denotes Hollow Point; HPBT denotes Hollow Point Boat Tail; J denotes Jacketed; JFP denotes Jacketed Flat Point; JHP denotes Jacketed Hollow Point; JHPBT denotes Jacketed Hollow Point Boat Tail; JSP denotes Jacketed Soft Point; JSPF denotes Jacketed Soft Point Flat; L denotes Lead; LFN denotes Lead Flat Nose; LFP denotes Lead Flat Point; LHP denotes Lead Hollow Point; LRN denotes Lead Round Nose; LSWC denotes Lead Semi-Wad Cutter; LSWC-GC denotes Lead Semi-Wad Cutter, Gas Checked; LTC denotes Lead Truncated Cone; LWC denotes Lead Wad Cutter; RN denotes Round Nose; RNFP denotes Round Nose Flat Point; RNL denotes Round Nosed Lead; RNSP denotes Round Nose Soft Point; SJHP denotes Semi Jacketed Hollow Point, Soft Jacket Hollow Point; SJSP denotes Soft Jacket Soft Point; SLAP denotes Saboted Light Armor Penetrating; SPTZ denotes Spitzer; Sub denotes Subsonic; SWC denotes Semi Wad Cutter; TC denotes Truncated Cone; TCMJ denotes Truncated Cone Metal Jacket; WC denotes Wad Cutter; AP denotes Armor piercing; API denotes Armor piercing incendiary; APIT denotes Armor piercing incendiary tracer; APT denotes Armor piercing tracer; CA denotes Copper Alloy; CAL denotes Caliber; GMCS denotes Gilding metal clad steel; HEAT denotes High-explosive antitank; HEI denotes High explosive incendiary; HEIT denotes High explosive, incendiary, tracer; RAP denotes Rocket Assisted Projectile; and TPT Target practice, tracer.

Reliable projectile manufacture requires uniformity from one projectile to the next in order to obtain consistent ballistic performance. In addition to projectile shape, other considerations, proper projectile seating and bullet-to-casing fit is required. In this manner, a desired pressure develops within the casing during firing prior to bullet and casing separation. Historically, projectile employ a cannelure, which is a slight annular depression formed in a surface of the projectile at a location determined to be the optimal seating depth for the bullet. In this manner, a visual inspection of a cartridge could determine whether or not the bullet is seated at the proper depth. Once the bullet is inserted into the casing to the proper depth, one of two standard procedures is incorporated to lock the bullet in its proper location. One method is the crimping of the entire end of the casing into the cannelure. A second method does not crimp the casing end; rather the bullet is pressure fitted into the casing, another method employs adhesive bonding to join the bullet to the casing.

FIG. 1a depicts an exploded view of the polymeric cartridge casing having an over-molded primer insert. A cartridge casing 10 suitable for use with rifles is shown manufactured with a casing 12 showing a propellant chamber 14 with a projectile 56 inserted into the forward end opening 16. The cartridge casing 12 has a substantially cylindrical open-ended bullet-end component 18 extending from the forward end opening 16 rearward to the opposite end 20. The forward end of bullet-end component 18 has a shoulder 24 forming a chamber neck 26. The bullet-end component 18 may be formed with coupling end 22 formed on substantially cylindrical opposite end 20 or formed as a separate component. These and other suitable methods for securing individual pieces of a two-piece or multi-piece cartridge casing are useful in the practice of the present invention. Coupling end 22 is shown as a male element, but may also be configured as a female element in alternate embodiments of the invention. In some embodiments the forward end of bullet-end component 18 includes the forward end opening 16 without a shoulder 24 forming chamber neck 26. The bullet-end component typically has a wall thickness between about 0.003 and about 0.200 inches and more preferably between about 0.005 and more preferably between about 0.150 inches about 0.010 and about 0.050 inches. The middle body component 28 is substantially cylindrical and connects the forward end of bullet-end component 18 to the substantially cylindrical opposite end 20 and forms the propellant chamber 14. The substantially cylindrical opposite end 20 includes a substantially cylindrical insert 32 that partially seals the propellant chamber 14. In a two piece design as shown in FIG. 1a the substantially cylindrical insert 32 is molded into the middle body component 28. The substantially cylindrical insert 32 includes a bottom surface (not shown) located in the propellant chamber 14 that is opposite a top surface (not shown). The substantially cylindrical insert 32 includes a primer recess (not shown) positioned in the top surface (not shown) extending toward the bottom surface (not shown) with a primer flash hole aperture (not shown) is located in the primer recess (not shown) and extends through the bottom surface (not shown) into the propellant chamber 14 to combust the propellant in the propellant chamber 14. A primer (not shown) is located in the primer recess (not shown) and extends through the bottom surface (not shown) into the propellant chamber 14. In some embodiments the coupling end 22 extends the polymer through the primer flash hole aperture (not shown) to form the primer flash hole (not shown) while retaining a passage from the top surface (not shown) through the bottom surface (not shown) and into the propellant chamber 14 to provide support and protection about the primer flash hole aperture (not shown). In other embodiments the coupling end 22 extends the polymer up to but not into the primer flash hole aperture (not shown) to form the primer flash hole (not shown) while retaining a passage from the top surface (not shown) through the bottom surface (not shown) and into the propellant chamber 14. The bullet-end 18, middle body 28 and bottom surface (not shown) define the interior of propellant chamber 14 in which the powder charge (not shown) is contained. The interior volume of propellant chamber 14 may be varied to provide the volume necessary for complete filling of the propellant chamber 14 by the propellant chosen so that a simplified volumetric measure of propellant can be utilized when loading the cartridge. The bullet-end and bullet components can then be welded or bonded together using solvent, adhesive, sintering, brazing, soldering, spin-welding, vibration-welding, ultrasonic-welding or laser-welding techniques. The welding or bonding increases the joint strength so the casing can be extracted from the hot gun casing after firing at the cook-off temperature. An optional first and second annular grooves (cannelures) may be provided in the bullet-end in the interlock surface of the male coupling element to provide a snap-fit between the two components. The cannelures formed in a surface of the bullet at a location determined to be the optimal seating depth for the bullet. Once the bullet is inserted into the casing to the proper depth to lock the bullet in its proper location. One method is the crimping of the entire end of the casing into the cannelures. The bullet-end and middle body components can then be welded or bonded together using solvent, adhesive, sintering, brazing, soldering, spin-welding, vibration-welding, ultrasonic-welding or laser-welding techniques. The welding or bonding increases the joint strength so the casing can be extracted from the hot gun casing after firing at the cook-off temperature.

Figure 1B:
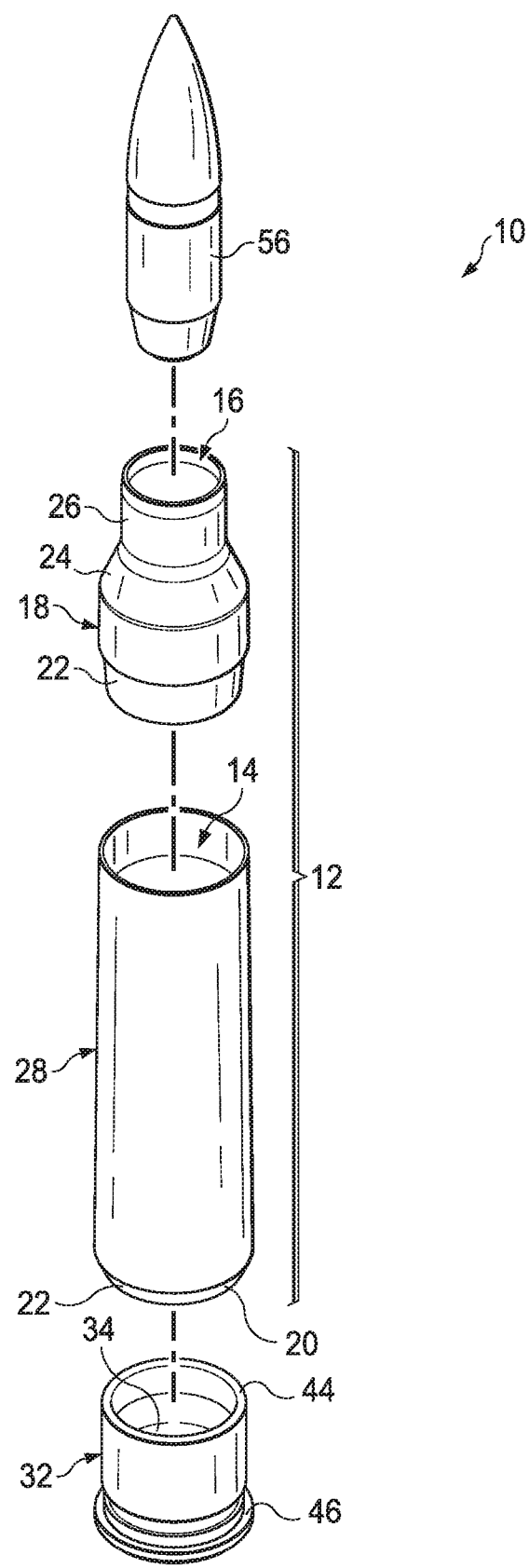
FIG. 1b depicts an exploded view of the polymeric cartridge casing.

FIG. 1b depicts an exploded view of a three piece polymeric cartridge casing. A cartridge casing 10 suitable for use with rifles is shown manufactured with a casing 12 showing a propellant chamber 14 with a projectile 56 inserted into the forward end opening 16. The cartridge casing 12 has a substantially cylindrical open-ended bullet-end component 18 extending from the forward end opening 16 rearward to the opposite end 20. The forward end of bullet-end component 18 has a shoulder 24 forming a chamber neck 26. The bullet-end component 18 may be formed with coupling end 22 formed on substantially cylindrical opposite end 20 or formed as a separate component. These and other suitable methods for securing individual pieces of the multi-piece cartridge casing are useful in the practice of the present invention. Coupling end 22 is shown as a male element, but may also be configured as a female element in alternate embodiments of the invention. In some embodiments the forward end of bullet-end component 18 includes the forward end opening 16 without a shoulder 24 forming chamber neck 26. The bullet-end component typically has a wall thickness between about 0.003 and about 0.200 inches and more preferably between about 0.005 and more preferably between about 0.150 inches about 0.010 and about 0.050 inches. The middle body component 28 is substantially cylindrical and connects the forward end of bullet-end component 18 to the substantially cylindrical opposite end 20 and forms the propellant chamber 14. The substantially cylindrical opposite end 20 includes a substantially cylindrical insert 32 that partially seals the propellant chamber 14. The substantially cylindrical insert 32 includes a bottom surface 34 located in the propellant chamber 14 that is opposite a top surface (not shown). The substantially cylindrical insert 32 includes a primer recess (not shown) positioned in the top surface (not shown) extending toward the bottom surface 34 with a primer flash hole aperture (not shown) is located in the primer recess (not shown) and extends through the bottom surface 34 into the propellant chamber 14 to combust the propellant in the propellant chamber 14. A primer (not shown) is located in the primer recess (not shown) and extends through the bottom surface 34 into the propellant chamber 14. When molded the coupling end 22 extends the polymer through the primer flash hole aperture (not shown) to form the primer flash hole (not shown) while retaining a passage from the top surface (not shown) through the bottom surface 34 and into the propellant chamber 14 to provide support and protection about the primer flash hole aperture (not shown). In other embodiments the coupling end 22 extends the polymer up to but not into the primer flash hole aperture (not shown) to form the primer flash hole (not shown) while retaining a passage from the top surface (not shown) through the bottom surface 34 and into the propellant chamber 14. The bullet-end 18, middle body 28 and bottom surface 34 define the interior of propellant chamber 14 in which the powder charge (not shown) is contained. The interior volume of propellant chamber 14 may be varied to provide the volume necessary for complete filling of the propellant chamber 14 by the propellant chosen so that a simplified volumetric measure of propellant can be utilized when loading the cartridge. The bullet-end and bullet components can then be welded or bonded together using solvent, adhesive, spin-welding, vibration-welding, ultrasonic-welding or laser-welding techniques. The welding or bonding increases the joint strength so the casing can be extracted from the hot gun casing after firing at the cook-off temperature. An optional first and second annular groove (first and second cannelures) may be provided in the bullet-end in the interlock surface of the male coupling element to provide a snap-fit between the two components. The cannelures formed in a surface of the bullet at a location determined to be the optimal seating depth for the bullet. Once the bullet is inserted into the casing to the proper depth to lock the bullet in its proper location. One method is the crimping of the entire end of the casing into the cannelures. The bullet-end and middle body components can then be welded or bonded together using solvent, adhesive, sintering, brazing, soldering, spin-welding, vibration-welding, ultrasonic-welding or laser-welding techniques. The welding or bonding increases the joint strength so the casing can be extracted from the hot gun casing after firing at the cook-off temperature.

Although FIGS. 1*a* and 1*b* describes a polymer cartridge the present invention also applies to metal cartridges (e.g., made by metal injection molding, casting, machining, forging, 3-D printing, and any other mechanism used to make a cartridge) and hybrid cartridges that include a cartridge made from a combination of polymers and metal or any combination of polymers or copolymers and metals and/or alloys. The present invention may also be used in a traditional metal cartridge casing. The metal cartridge casing includes a metal casing having a propellant chamber with a forward end opening for insertion of a projectile. The forward end opening may include a shoulder forming chamber neck. The opposite end of the forward end opening in the metal cartridge casing includes a flange around the parameter and a primer recess with a primer flash aperture formed therein for ease of insertion of the primer (not shown). A primer flash hole aperture is located in the primer recess and extends into the propellant chamber to combust the propellant in the propellant chamber.

Figure 2:
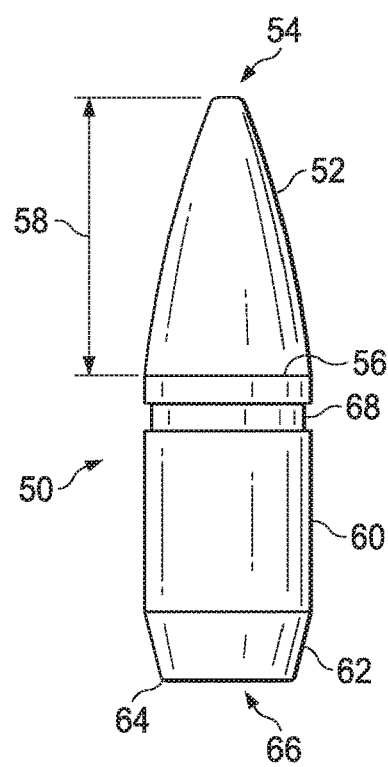
FIG. 2 is an image of a flat tip boattail projectile.

FIG. 2 is a general image of a bullet or projectile. For the purpose of description the general projectile shape is shown below as the projectile 50. The projectile 50 of the present invention includes all shapes and calibers. The present invention is not limited to the described caliber and is believed to be applicable to other calibers as well. This includes various small and medium caliber munitions, including 5.56 mm, 7.62 mm, 308, 338, 3030, 3006, and .50 caliber ammunition cartridges, as well as medium/small caliber ammunition such as 380 caliber, 38 caliber, 9 mm, 10 mm and military style ammunition including 12.7 mm, 14.5 mm, 14.7 mm, 20 mm, 25 mm, 30 mm, 40 mm, 57 mm, 60 mm, 75 mm, 76 mm, 81 mm, 90 mm, 100 mm, 105 mm, 106 mm, 115 mm, 120 mm, 122 mm, 125 mm, 130 mm, 152 mm, 155 mm, 165 mm, 175 mm, 203 mm, 460 mm, 8 inch, 4.2 inch, 45 caliber and the like. Thus, the present invention is also applicable to the sporting goods industry for use by hunters and target shooters as well as military use.

The projectile 50 may have any profile but generally has an aerodynamic streamlined shape at the head and at the tail, e.g., spritzer, flat base spritzer, boat tail spritzer, tapered-heel spritzer, rounded nose, rounded nose flat base, rounded nose boat tail, rounded nose tapered-heel, flat nose, flat nose flat base, flat nose boat tail, flat nose tapered-heel, hollow point, hollow point boat tail, hollow point flat base, hollow point tapered-heel and so on. Although any head shape can be used, more common shapes include spritzer shape, round, conical, frustoconical, blunted, wadcutter, or hollow point, and the more common tail shape includes flat base, boat tail, tapered-heel expanded bases or banded bases. The bullets of the present invention may have any profile and weight dictated by the particular application. For example, the method and bullets of the present invention may be used in full metal jacket metal cased and full metal jacket both refer to bullets with a metal coating that covers all of, or all but the base of a bullet; metal cased (e.g., as used by REMINGTON® to refer to their full metal jacketed bullets); hollow point bullets have a concave shaped tip that facilitates rapid expansion of the round upon impact; boat tail bullets have a streamlined base to facilitate better aerodynamics; boat tail hollow point; full metal jacketed boat tail; point jacketed hollow point bullets are similar in design to regular hollow point bullets, but have a copper jacket that normally covers everything but the hollowed portion of the round; jacketed flat point rounds have a flat area of exposed lead at the tip; jacketed soft point bullets usually have a spire pointed tip of exposed lead. Jacketed spitzer point can refer to a jacketed spitzer point; spitzer meaning a sharply pointed bullet; jacketed round nose jacketed round nose bullets split the difference between jacketed flat point and jacketed spitzer point bullets and have a rounded tip of exposed lead boat tail soft point sometimes the letters in the acronyms are switched, so boat tail soft point may also be abbreviated as soft point boat tail. Expanding full metal jacketed rounds appear as and feed like a regular full metal jacket bullet, but have a construction that allows the case to collapse and the bullet to flatten upon impact. Wad cutter designs often appear to be nothing more than a cylinder, usually with a hollow base which is used in target practice to punch neat holes in the paper, rather than the ragged holes produced by more rounded designs. Semi wad cutter bullets have a more rounded nose that comes down to a cylinder that is slightly larger than the rounded section, giving the bullet a more aerodynamic shape while allowing it to punch clean holes in paper targets.

Rounded flat point bullets have a flat tip that is smaller than the bullet diameter and rounded shoulders. Armor piercing ammunition can have bullets with a variety of shapes, though in general they are spire pointed and full metal jacketed rounds that have a strong core designed to penetrate armor. Armor piercing incendiary ammunition has the same penetrating abilities of armor piercing bullets, but with the added function of bursting into an intense flame upon impact. Frangible ammunition is available under a number of trademarks; notably MAGSAFE®, GLASER®, and SINTERFIRE® and are characterized by a design that facilitates the rapid breakup of the bullet upon impact, thus, reducing the chances of over-penetration or a ricochet. Exploding ammunition includes delayed and aerial/above ground exploding ammunition plus ammunition that can penetrate an objective and have a delay before exploding after penetrating. Also included are jacketed designs where the core material is a very hard, high-density metal such as tungsten, tungsten carbide, depleted uranium, or steel.

FIG. 2 is an image of a flat nose boattail projectile. The projectile 50 includes an ogive 52 that extends from the nose 54 (flat tip) to the shoulder 56. The distance from the nose 54 to the shoulder 56 is the head or ogive distance 58, with the distance from the shoulder 56 extending away from the nose 54 is the bearing surface 60. The bearing surface 60 may be extended with a boattail 62, which tappers to heal 64 that curves to form a base 66. An optional cannelure 68 may be positioned on the bearing surface 60 below the shoulder 56.

Figure 3:
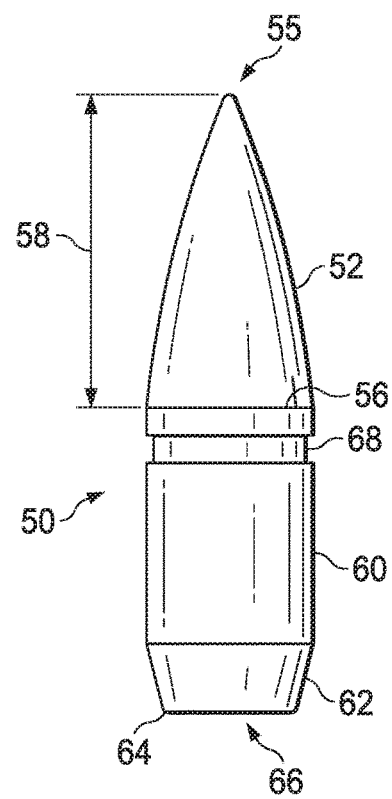
FIG. 3 is an image of a full metal jacket, expanding full metal jacket, spritzer, jacketed spritzer, armor piercing, armor piercing incendiary or a similar projectile having a pointed nose and a boattail configured end.

FIG. 3 is an image of an full metal jacket, expanding full metal jacket, spritzer, jacketed spritzer, armor piercing, armor piercing incendiary or a similar projectile 50 having a pointed nose 55 and a boattail 62. The ogive 52 extends from the pointed nose 55 (pointed tip) to the shoulder 56. The distance from the nose 54 to the shoulder 56 is the head or ogive distance 58, with the distance from the shoulder 56 extending away from the pointed nose 55 is the bearing surface 60. The bearing surface 60 may be extended with a boattail 62, which tappers to heal 64 that curves to form a base 66. An optional cannelure 68 may be positioned on the bearing surface 60 below the shoulder 56.

Figure 4:
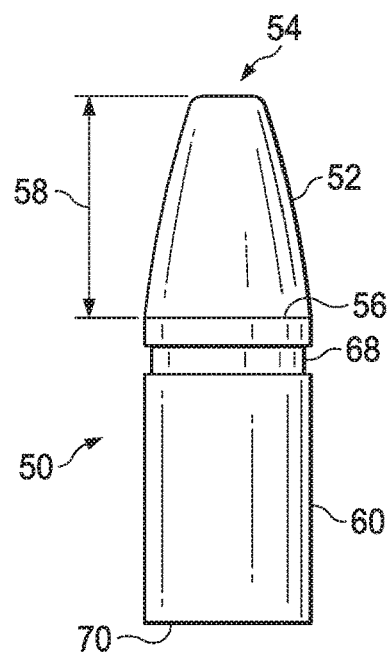
FIG. 4 is an image of a flat tip projectile with a flat base configured end.

FIG. 4 is an image of a flat nose flat base projectile. The projectile 50 includes an ogive 52 that extends from the nose 54 (flat tip) to the shoulder 56. The distance from the nose 54 to the shoulder 56 is the head or ogive distance 58, with the distance from the shoulder 56 extending away from the nose 54 is the bearing surface 60. The bearing surface 60 ends with a flat base 70. An optional cannelure 68 may be positioned on the bearing surface 60 below the shoulder 56.

Figure 5:
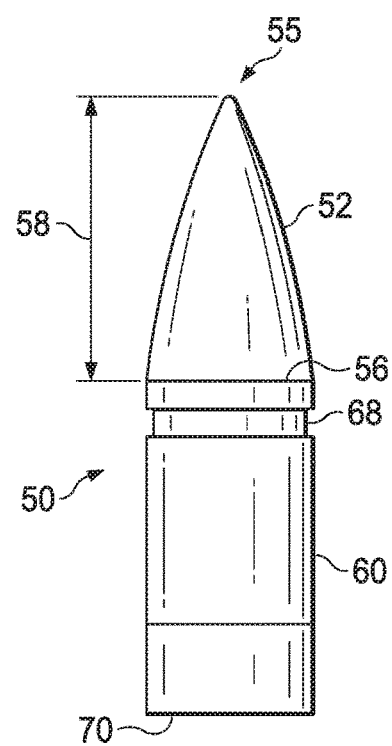
FIG. 5 is an image of a full metal jacket, expanding full metal jacket, spritzer, jacketed spritzer, armor piercing, armor piercing incendiary or a similar projectile having a pointed nose and a flat base configured end.

FIG. 5 is an image of an full metal jacket, expanding full metal jacket, spritzer, jacketed spritzer, armor piercing, armor piercing incendiary or a similar projectile 50 having a pointed nose 55 and a flat base 70. The ogive 52 extends from the pointed nose 55 (pointed tip) to the shoulder 56. The distance from the pointed nose 55 to the shoulder 56 is the head or ogive distance 58, with the distance from the shoulder 56 extending away from the pointed nose 55 is the bearing surface 60. The bearing surface 60 ends with a flat base 70. An optional cannelure 68 may be positioned on the bearing surface 60 below the shoulder 56.

Figure 6:
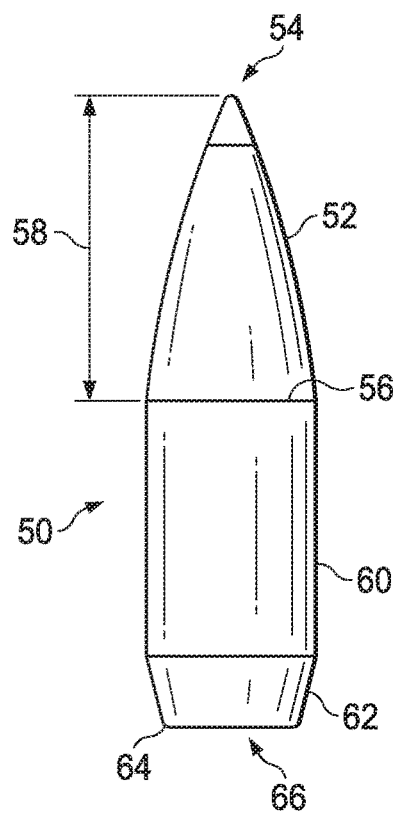
FIG. 6 is an image of a boattail configured end projectile without a cannelure.

FIG. 6 is an image of a boattail projectile without a cannelure. The projectile 50 includes an ogive 52 that extends from the nose 54 to the shoulder 56. The distance from the nose 54 (blunt or pointed (not shown)) to the shoulder 56 is the head or ogive distance 58, with the distance from the shoulder 56 extending away from the nose 54 is the bearing surface 60. The bearing surface 60 may be extended with a boattail 62, which tappers to heal 64 that curves to form a base 66.

Figure 7:
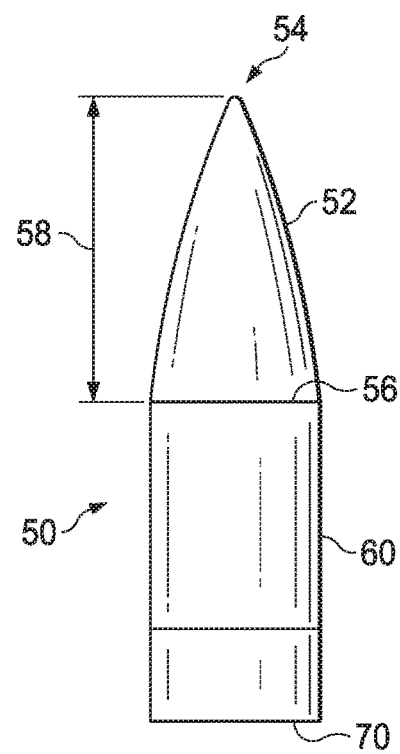
FIG. 7 is an image of a flat base configured end projectile without a cannelure.

FIG. 7 is an image of a flat base projectile without a cannelure. The ogive 52 extends from the nose 54 (blunt or pointed (not shown)) to the shoulder 56. The distance from the nose 54 to the shoulder 56 is the head or ogive distance 58, with the distance from the shoulder 56 extending away from the nose 54 is the bearing surface 60. The bearing surface 60 may be extended to flat base 70.

Figure 8:
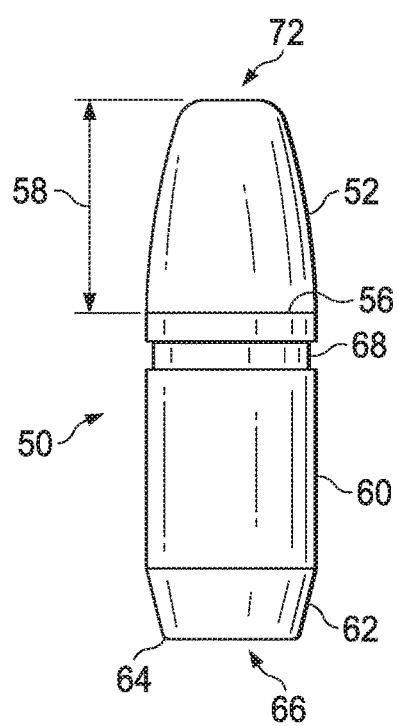
FIG. 8 is an image of a boattail configured end projectile with rounded nose.

FIG. 8 is an image of a boattail projectile 50 with rounded nose. The projectile 50 includes an ogive 52 that extends from the rounded nose 72 to the shoulder 56. The distance from the rounded nose 72 to the shoulder 56 is the head or ogive distance 58, with the distance from the shoulder 56 extending away from the nose 72 is the bearing surface 60. The bearing surface 60 may be extended with a boattail 62, which tappers to heal 64 that curves to form a base 66. An optional cannelure 68 may be positioned on the bearing surface 60 below the shoulder 56.

Figure 9:
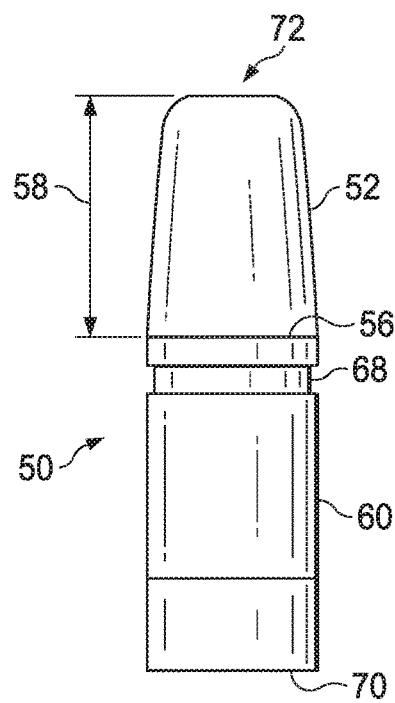
FIG. 9 is an image of a flat base projectile with a rounded nose.

FIG. 9 is an image of a flat base projectile 50 with a rounded nose 72. The ogive 52 extends from the rounded nose 72 to the shoulder 56. The distance from the rounded nose 72 to the shoulder 56 is the head or ogive distance 58, with the distance from the shoulder 56 extending away from the rounded nose 72 is the bearing surface 60. The bearing surface 60 may be extended to flat base 70. An optional cannelure 68 may be positioned on the bearing surface 60 below the shoulder 56.

Figure 10:
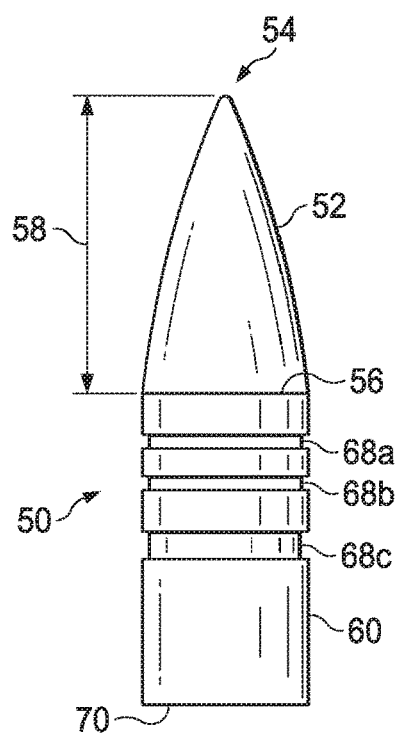
FIG. 10 is an image of a flat base configured end projectile having multiple cannelures.

FIG. 10 is an image of a flat base projectile 50 having multiple cannelures 68a-68c. The ogive 52 extends from the nose 54 to the shoulder 56. The distance from the nose 54 to the shoulder 56 is the head or ogive distance 58, with the distance from the shoulder 56 extending away from the nose 54 is the bearing surface 60. The bearing surface 60 terminates in a flat base 70. The cannelures 68a-68c may be positioned on the bearing surface 60 below the shoulder 56. Although 1 and 3 cannelures 68a-68c are shown as representative examples, any number of cannelures may be used, e.g., 1,2, 3, 4, 5, 6, 7, 8, 9, 10 or more cannelures having various thicknesses and depths.

Figure 11:
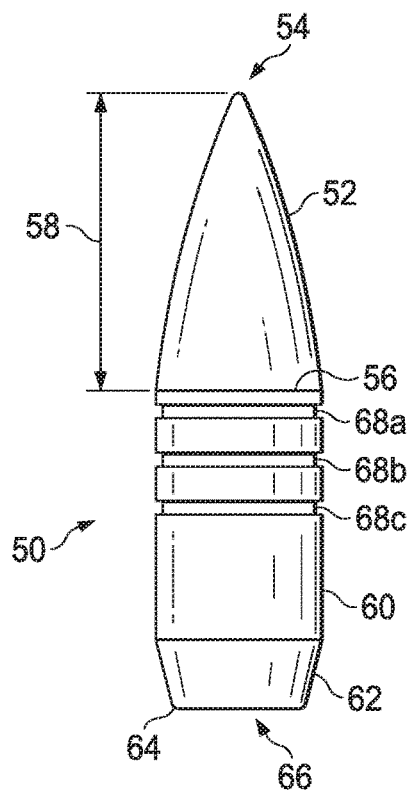
FIG. 11 is an image of a boattail configured end projectile having multiple cannelures.

FIG. 11 is an image of a boattail projectile 50 having multiple cannelures 68a-68c. The projectile 50 includes an ogive 52 that extends from the nose 54 to the shoulder 56. The distance from the nose 54 to the shoulder 56 is the head or ogive distance 58, with the distance from the shoulder 56 extending away from the nose 54 is the bearing surface 60. The bearing surface 60 may be extended with a boattail 62, which tappers to heal 64 that curves to form a base 66. Although 1 and 3 cannelures 68a-68c are shown as representative examples, any number of cannelures may be used, e.g., 1,2, 3, 4, 5, 6, 7, 8, 9, 10 or more cannelures having various thicknesses and depths.

These projectiles described herein may be made using a metal injection molding process. The metal injection molding process, which generally involves mixing fine metal powders with binders to form a feedstock that is injection molded into a closed mold, may be used to form a substantially cylindrical insert. After ejection from the mold, the binders are chemically or thermally removed from the substantially cylindrical insert so that the part can be sintered to high density. During the sintering process, the individual metal particles metallurgically bond together as material diffusion occurs to remove most of the porosity left by the removal of the binder.

Figure 12:
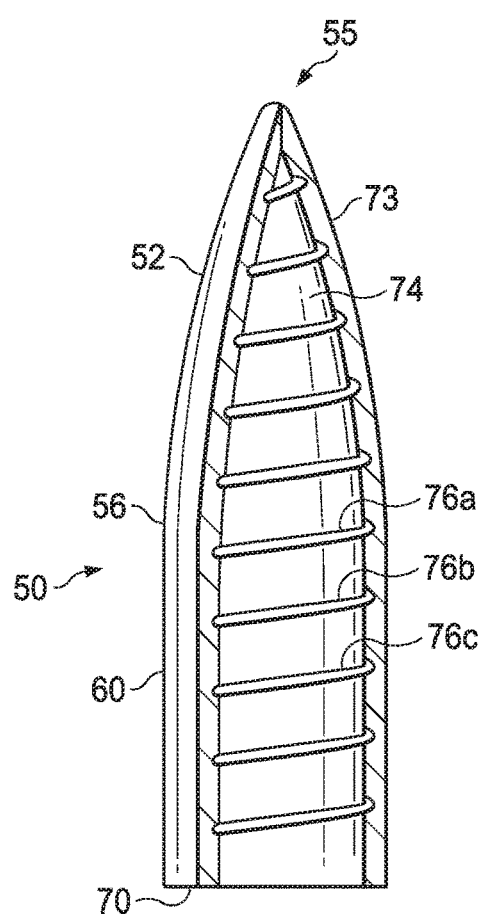
FIG. 12 is a cut away image of a jacketed spritzer projectile.

FIG. 12 is a cut away image of a jacketed spritzer projectile. The projectile 50 includes a nose 55 that extends to a shoulder 56. A bearing surface 60 extends from the shoulder 56 to the base 70. The outer surface 73 of the projectile 50 is a metal jacket covering a metal core 74 that includes a spiral ridge 76a, 76b and 76c (alternatively it may be a spiral groove). In addition, at least a portion of the ogive 52 of the outer surface 73 may be of a softer metal to allow deformation at impact allowing the metal core 74 to penetrate the target.

Figure 13:
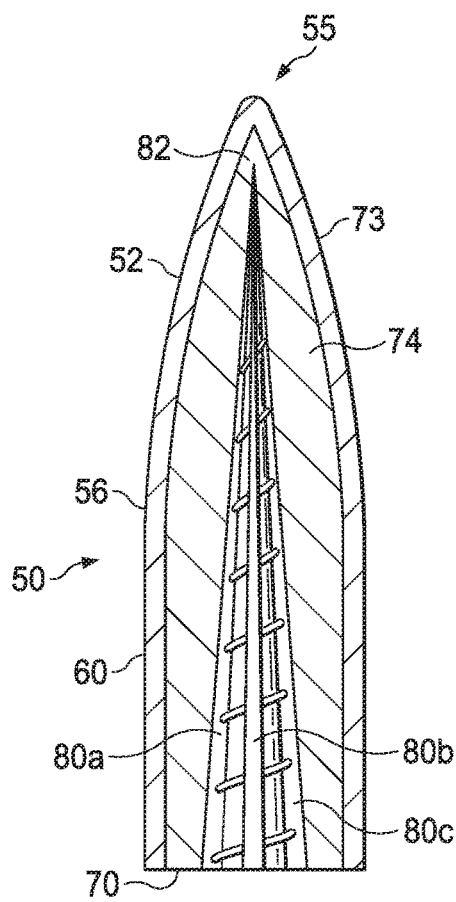
FIG. 13 is a cut away image of a jacketed projectile.

FIG. 13 is a cut away image of a jacketed projectile. The projectile 50 includes a nose 55 that extends to a shoulder 56. A bearing surface 60 extends from the shoulder 56 to the base 70. The outer surface 73 of the projectile 50 is a metal jacket covering a metal core 74 that encompasses a central projectile 78 having ridges or fins 80a, 80b and 80c that terminate at a tip 82 (alternatively the central projectile 78 may have spiral grooves or ridges). In addition, at least a portion of the ogive 52 of the outer surface 73 may be of a softer metal to allow deformation at impact allowing the metal core 74 to penetrate the target.

Figure 14:
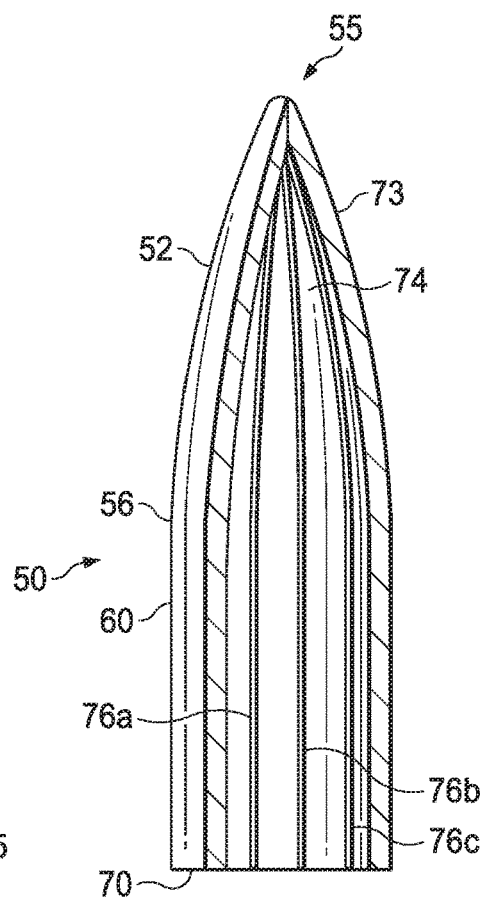
FIG. 14 is a cut away image of a jacketed projectile.

FIG. 14 is a cut away image of a jacketed projectile. The projectile 50 includes a nose 55 that extends to a shoulder 56. A bearing surface 60 extends from the shoulder 56 to the base 70. The outer surface 73 of the projectile 50 is a metal jacket covering a metal core 74 that includes longitudinal ridges 76a, 76b and 76c (alternatively it may be longitudinal grooves). In addition, at least a portion of the ogive 52 of the outer surface 73 may be of a softer metal to allow deformation at impact allowing the metal core 74 to penetrate the target.

Figure 15:
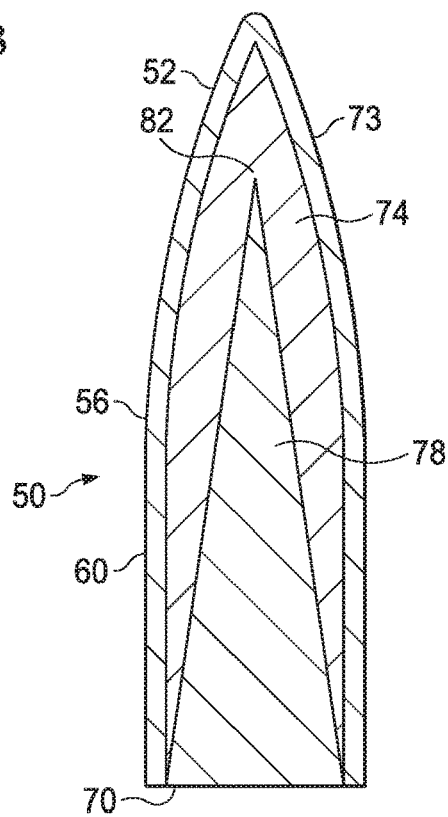
FIG. 15 is a cut away image of a jacketed projectile.

FIG. 15 is a cut away image of a jacketed projectile. The projectile 50 includes a nose 55 that extends to a shoulder 56. A bearing surface 60 extends from the shoulder 56 to the base 70. The outer surface 73 of the projectile 50 is a jacket covering a metal core 74 that encompasses a central projectile 78 that terminate at a tip 82. In addition, at least a portion of the ogive 52 of the outer surface 73 may be of a softer metal to allow deformation at impact allowing the metal core 74 to penetrate the target.

Figure 16:
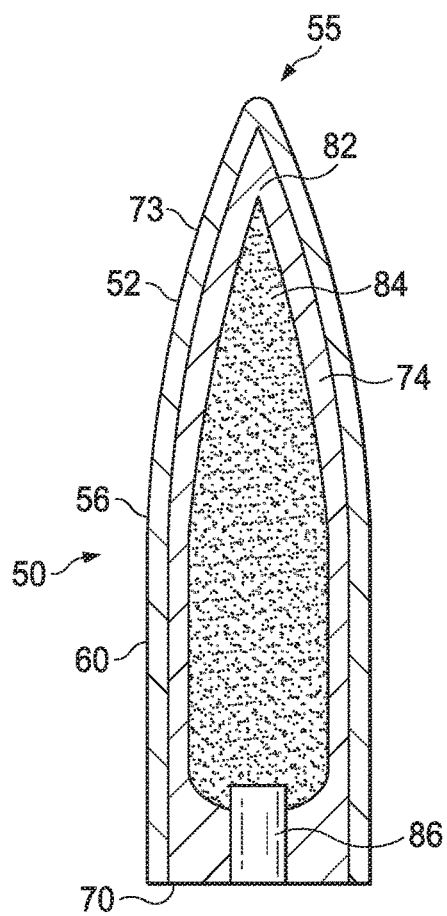
FIG. 16 is a cut away image of a jacketed projectile.

FIG. 16 is a cut away image of a jacketed projectile. The projectile 50 includes a nose 55 that extends to a shoulder 56. A bearing surface 60 extends from the shoulder 56 to the base 70. The outer surface 73 of the projectile 50 is a jacket covering a metal core 74 that encompasses a central region 84 that terminate at a tip 82. The central region 84 may contain a flammable composition that is ignited by ignition source 86.

Figure 17:
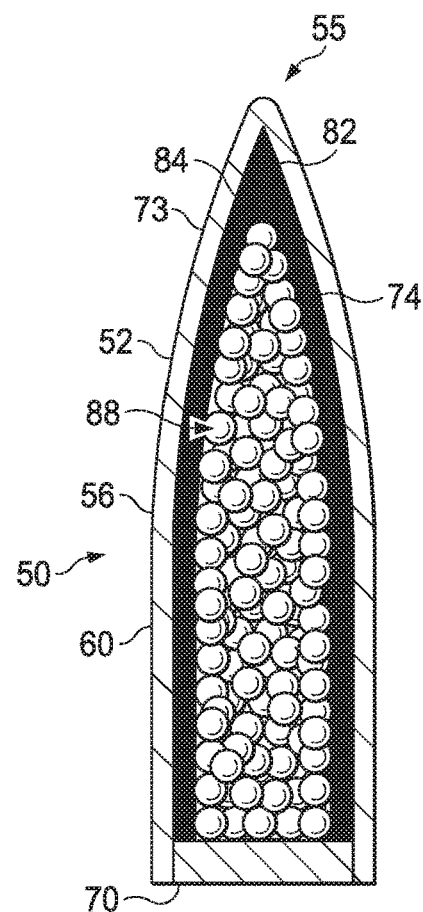
FIG. 17 is a cut away image of a jacketed projectile.

FIG. 17 is a cut away image of a jacketed projectile. The projectile 50 includes a nose 55 that extends to a shoulder 56. A bearing surface 60 extends from the shoulder 56 to the base 70. The outer surface 73 of the projectile 50 is a jacket covering a metal core 74 that encompasses a central region 84 that terminate at a tip 82. The central region 84 may contain pelleted materials 88 that may be ejected upon impact. In addition, at least a portion of the ogive 52 of the outer surface 73 may be of a softer metal to allow deformation at impact allowing more efficient ejection of the pelleted materials 88.

Figure 18:
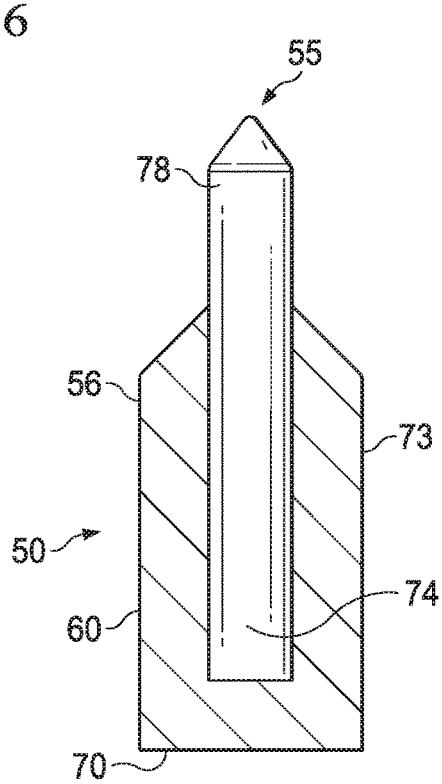
FIG. 18 is a cut away image of a jacketed projectile.

FIG. 18 is a cut away image of a jacketed projectile. The projectile 50 includes a nose 55 that extends to a shoulder 56. A bearing surface 60 extends from the shoulder 56 to the base 70. The outer surface 73 of the projectile 50 partially covers a central projectile 78 to allow the central projectile 78 to penetrate the target.

Figure 19A:
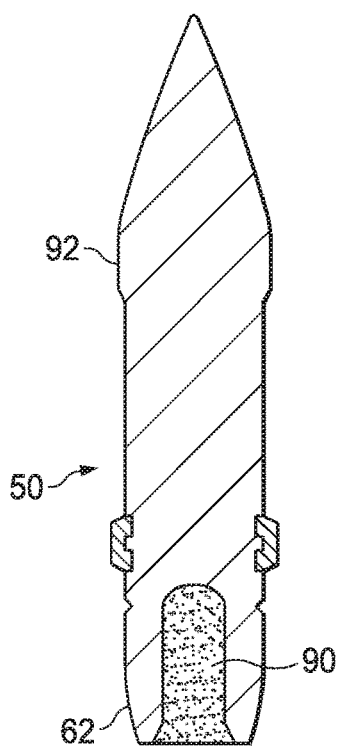
FIGS. 19a-19s are images of a cut away image of different projectile types.
Figure 19B:
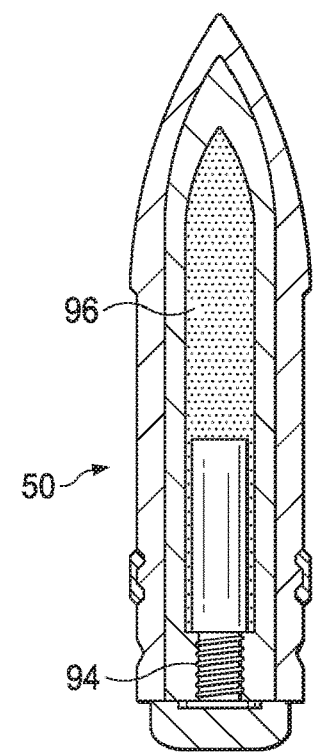
Figure 19C:
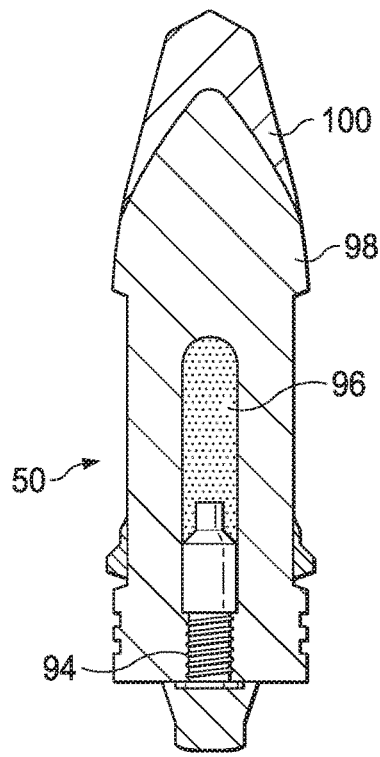
Figure 19D:
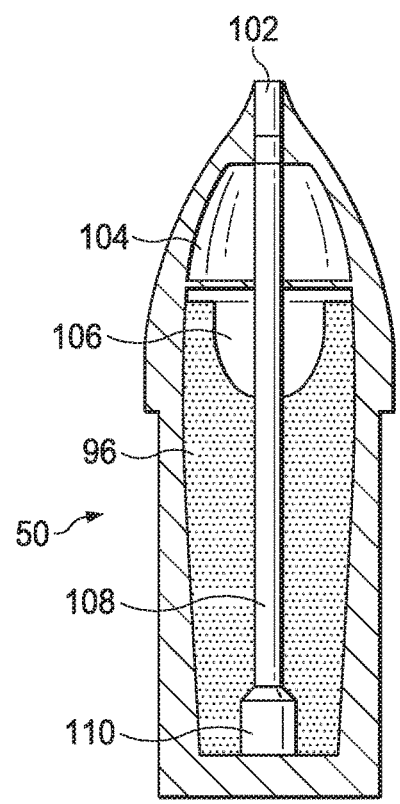
Figure 19E:
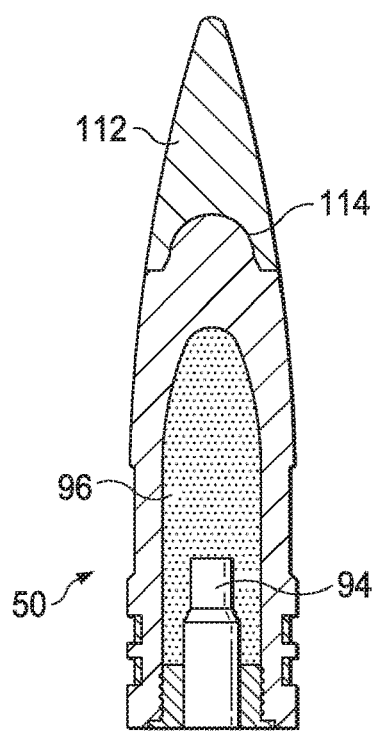
Figure 19F:
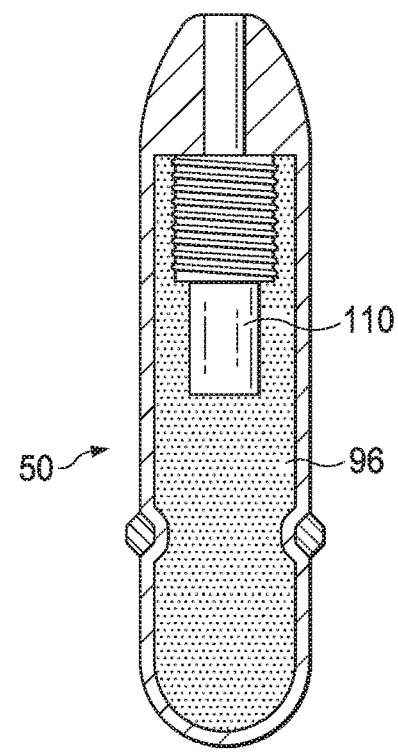
Figure 19G:
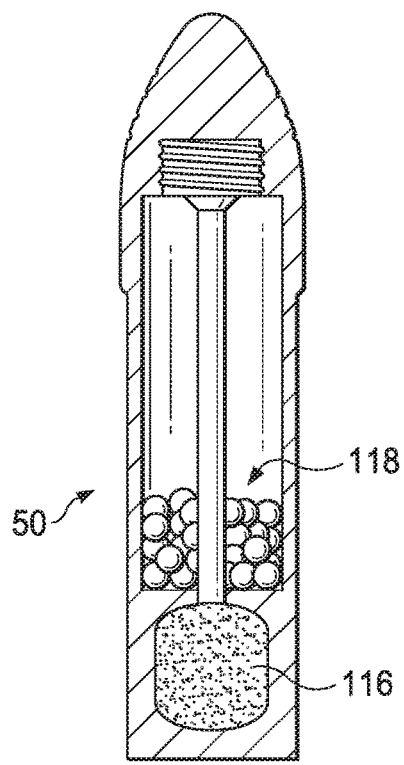
Figure 19H:
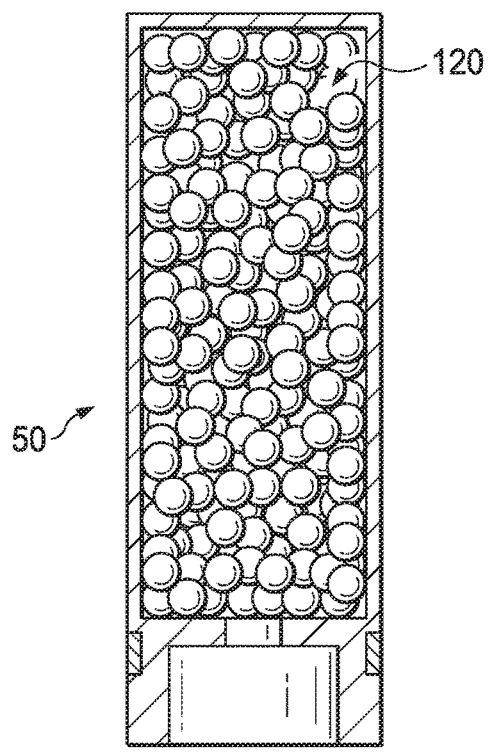
Figure 19I:
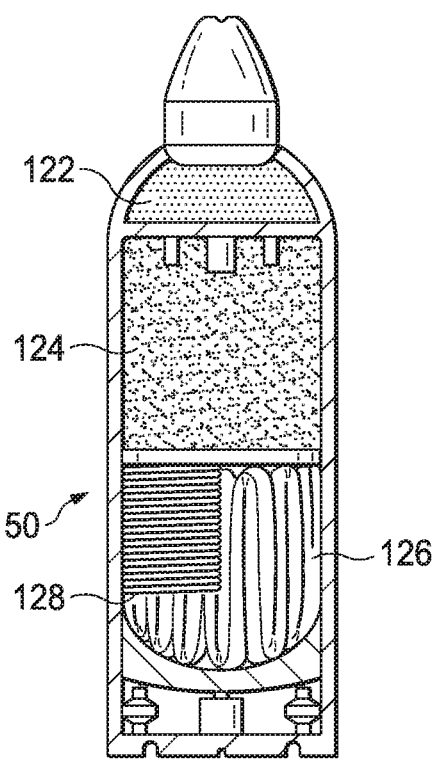
Figure 19J:
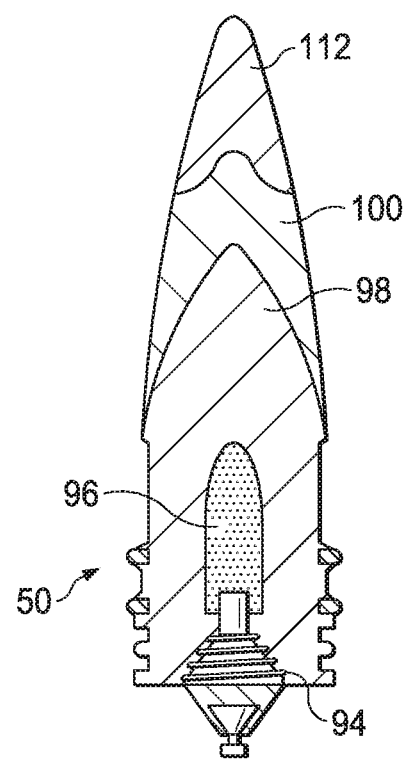
Figure 19K:
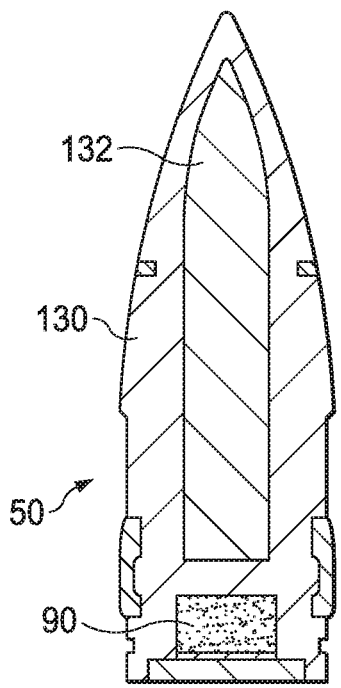
Figure 19L:
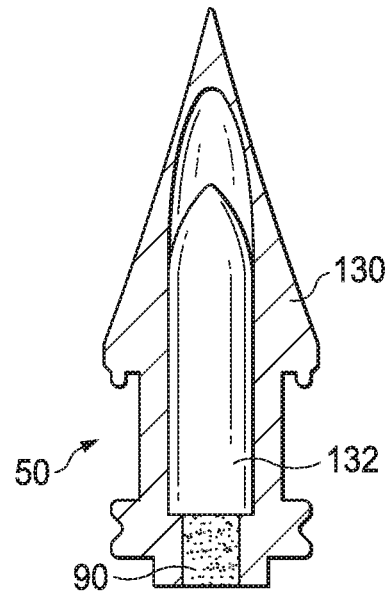
Figure 19M:
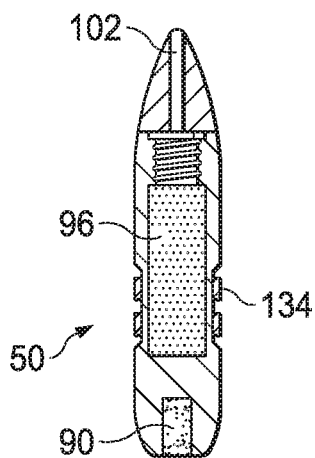
Figure 19N:
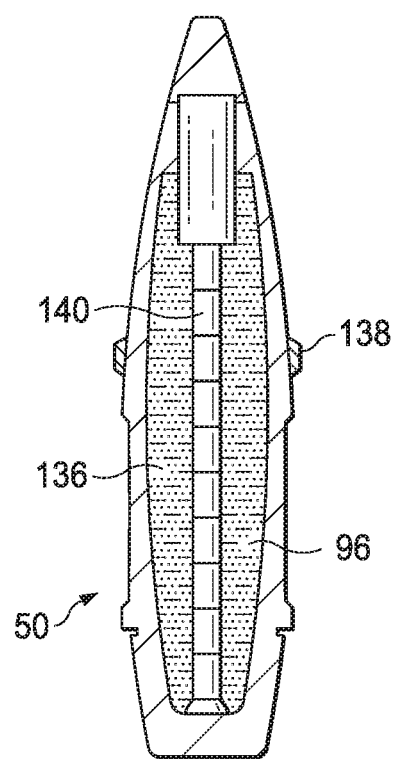
Figure 19O:
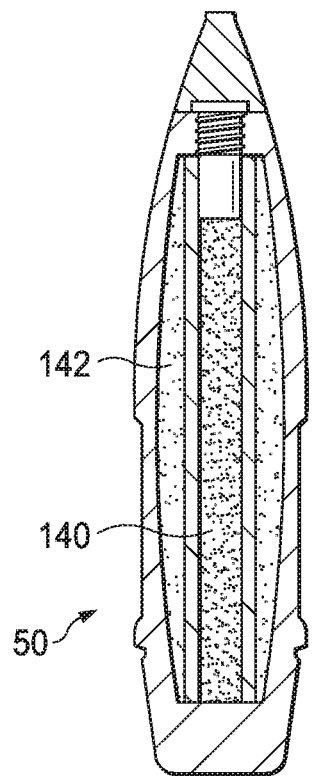
Figure 19P:
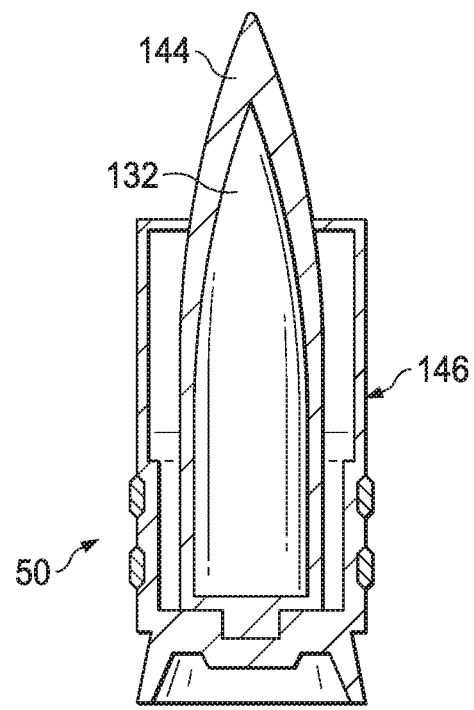
Figure 19Q:
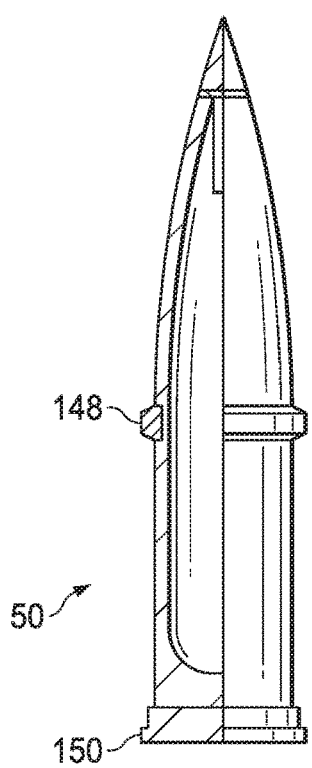
Figure 19R:
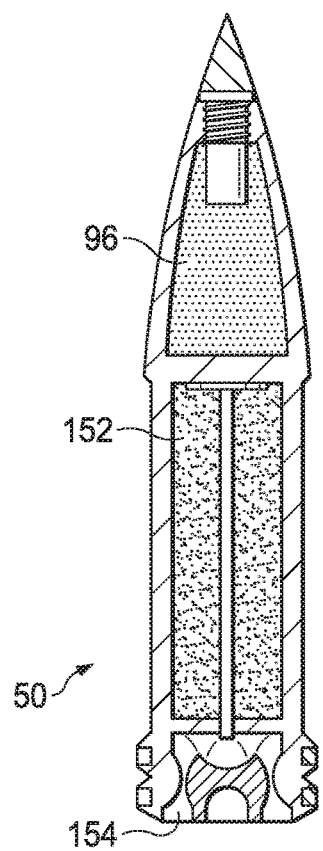
Figure 19S:
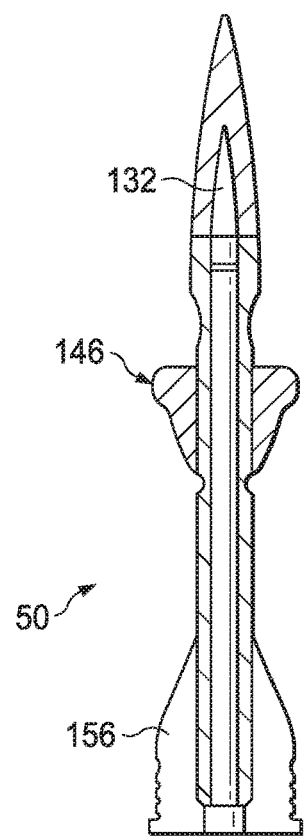

FIGS. 19a-19s are images of a cut away image of different projectile types. FIG. 19a is an image of a projectile 50 that is an armor piercing tracer having a boattail 62 configured end, a tracer element 90 and solid shot 92. FIG. 19b is an image of a projectile 50 that is an armor piercing high explosive projectile having a base fuse 94 and high explosive charge 96. FIG. 19c is an image of a projectile 50 that is an armor piercing high explosive projectile having a base fuse 94, high explosive charge 96 and an armor piercing shot 98 and armor piercing cap 100. FIG. 19d is an image of a projectile 50 that is a heat shaped charge projectile having a fuse 102, void space 104 and cavity 106 and a high explosive charge 96 surrounding a flash tube 108 connecting the fuse 102 and the booster 110. FIG. 19e is an image of a projectile 50 that is an anti-concrete projectile having a ballistic cap 112 housing a blunt nose 114 connected to a base fuse 94 and high explosive charge 96. FIG. 19f is an image of a projectile 50 that is a high-explosive and high capacity projectile having a high explosive 50 and a booster 110. FIG. 19g is an image of a projectile 50 that is a shrapnel projectile that includes a shrapnel projectile having a base ejection mechanism 116 and a shrapnel 118. FIG. 19h is an image of a projectile 50 that is a canister projectile having shot 120 disposed in the canister. FIG. 19i is an image of a projectile 50 that is an illuminating projectile that includes an ejection charge 122 and an illumination element 124 connected to a parachute 126 connected to a suspending cord 128. FIG. 19j is an image of a projectile 50 that is an armor piercing cap ballistic cap projectile having a base fuse 94, high explosive charge 96 and an armor piercing shot 98, armor piercing cap 100 and ballistic cap 112. FIG. 19k is an image of a projectile 50 that is a high velocity armor piercing projectile having a tracer element 90 and a light metal casing 130 over a hard dense core 132. FIG. 19l is an image of a projectile 50 that is a high velocity armor piercing arrowhead projectile having a tracer element 90 and a light metal casing 130 over a hard dense core 132. FIG. 19m is an image of a projectile 50 that is a high explosive projectile having a fuse 102, high explosive charge 96, a tracer element 90 and a rotation band 134. FIG. 19n is an image of a projectile 50 that is a high explosive chemical projectile having one or more chemicals 136 with a high explosive charge 96 and a high explosive burster 140, and a centering band 138. FIG. 19o is an image of a projectile 50 that is a smoke projectile having one or more smoke compositions 142 and a high explosive burster 140. FIG. 19p is an image of a projectile 50 that is a discarding sabot projectile having a hard core 132 covered by a outer shell 144 and a discardable carrier 146. FIG. 19q is an image of a projectile 50 that is a tapered bore projectile having a bourrelet 148 and a rotating flange 150. FIG. 19r is an image of a projectile 50 that is a rocket assisted projectile having a high explosive charge 96 and a rocket propellant 152 with venturis 154. FIG. 19s is an image of a projectile 50 that is a discarding sabot projectile having a hard core 132 with one or more fins 156 and a discardable carrier 146.

Figure 20Q:
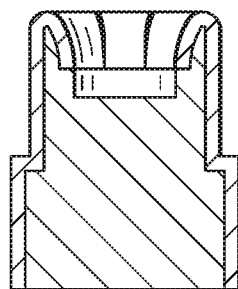
FIGS. 20a-20v are images of different embodiments of the projectiles of the present invention.
Figure 20R:
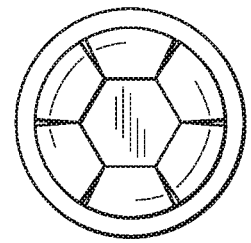
Figure 20S:
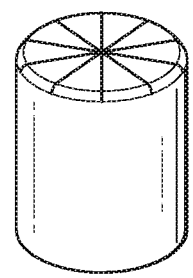
Figure 20T:
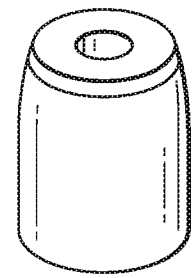
Figure 20U:
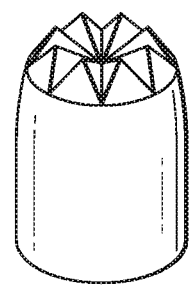
Figure 20V:
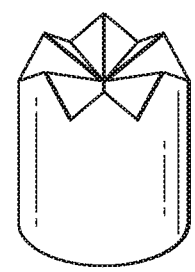

FIGS. 20a-20v are images of various projectiles of the present invention. FIG. 20a is a perspective view of a round point projectile. FIGS. 20b-20e are side views of a round point projectile. FIGS. 20f-20g are perspectives view of a blunt point projectile. FIGS. 20h-20k are side views of a blunt point projectile. FIG. 20*l* is a perspective view of a flat point projectile. FIGS. 20*m*-20*p* are side views of a flat point projectile. FIG. 20*q* is a cut through view of a hollow point projectile having relief grooves. FIG. 20*r* is a top view of a hollow point projectile having relief grooves. FIG. 20*t* is a perspective view of a hollow point projectile. FIGS. 20*s*, 20*u* and 20*v* are perspective views of one embodiment of a projectile of the present invention.

Figure 21:
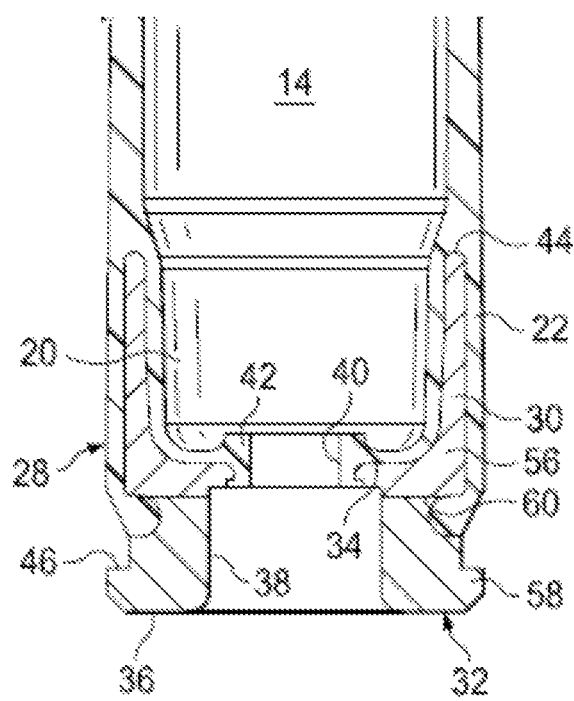
FIG. 21 depicts a side, cross-sectional view of a portion of the polymeric cartridge case according to one embodiment of the present invention.

FIG. 21 depicts a side, cross-sectional view of a portion of the polymeric cartridge case having a two piece primer insert. The substantially cylindrical primer insert 32 has an upper primer insert portion 56 and a lower primer insert portion 58 joined at insert joint 60. The upper primer insert portion 56 may be of the same or different materials than lower primer insert portion 58. The upper primer insert portion 56 mates to the lower primer insert portion 58 at insert joint 60 while retaining the primer flash hole 40 and the primer recess 38. The insert joint 60 may connect the upper primer insert portion 56 and the lower primer insert portion 58 by welding or bonding using solvent, adhesive, spin-welding, vibration-welding, ultrasonic-welding or laser-welding techniques. In addition, multiple methods may be used to increase the joint strength. The upper primer insert portion 56 includes a substantially cylindrical coupling element 30 extending from a bottom surface 34 that is opposite a top surface 36. The coupling element 30 extends with a taper to a smaller diameter at the tip 44. Located in the top surface 36 is a primer recess 38 that extends toward the bottom surface 34. A primer flash hole 40 is located in the primer recess 38 and extends through the bottom surface 34 into the propellant chamber 14. The coupling end 22 of the middle body extends the polymer through the primer flash hole 40 to form an aperture coating 42 while retaining a passage from the top surface 36 through the bottom surface 34 and into the propellant chamber 14 to provide support and protection about the primer flash hole 40. When overmolded the coupling end 22 interlocks with the substantially cylindrical coupling element 30. The coupling element 30 extends with a taper to a smaller diameter at the tip 44 to physical interlock the substantially cylindrical insert 32 to the middle body component. The substantially cylindrical insert 32 includes a substantially cylindrical coupling element 30 extending from a bottom surface 34 that is opposite a top surface 36. Located in the top surface 36 is a primer recess 38 that extends toward the bottom surface 34. A primer flash hole 40 is located in the primer recess 38 and extends through the bottom surface 34 into the propellant chamber 14. The coupling end 22 extends the polymer through the primer flash hole 40 to form an aperture coating 42 while retaining a passage from the top surface 36 through the bottom surface 34 and into the propellant chamber 14 to provide support and protection about the primer flash hole 40. When contacted the coupling end 22 interlocks with the substantially cylindrical coupling element 30, through the coupling element 30 that extends with a taper to a smaller diameter at the tip 44 to physical interlock the substantially cylindrical insert 32 and the middle body component 28.

The present invention also provides MIMs of spin-stabilized projectiles. Spinning a projectile promotes flight stability. Spinning is obtained by firing the projectiles through a rifled tube. The projectile engages the rifling by means of a rotating band normally made of copper. The rotating band is engaged by the lands and grooves. At a nominal muzzle velocity of 2,800 feet per second, spin rates on the order of 250 revolutions per second are encountered. Spin-stabilized projectiles are full bore (flush with the bore walls) and are limited approximately to a 5:1 length-to-diameter ratio. They perform very well at relatively low trajectories (less than 45 quadrant elevation). In high trajectory applications they tend to overstabilize (maintain the angle at which they were fired) and, therefore, do not follow the trajectory satisfactorily so other rations may be used to account for this.

The present invention also provides MIMs of fin-stabilized projectiles to obtain stability through the use of fins located at the aft end of the projectile. Normally, four to six fins are employed. Additional stability is obtained by imparting some spin (approximately 20 revolutions/second) to the projectile by canting the leading edge of the fins. Fin-stabilized projectiles are very often subcaliber. A sabot, wood or metal fitted around the projectile, is used to center the projectile in the bore and provide a gas seal. Such projectiles vary from 10:1 to 15:1 in length-to-diameter ratio. Fin-stabilized projectiles are advantageous because they follow the trajectory very well at high-launch angles, and they can be designed with very low drag thereby increasing range and/or terminal velocity.

The present invention also provides MIMs of rocket-assisted projectiles to extend the range over standard gun systems and to allow for lighter mount and barrel design and reduce excessive muzzle flash and smoke by reducing the recoil and setback forces of standard gun systems. Since the ranges are different, the above two objectives represent opposite approaches in the development of rocket-assisted projectiles. Normally, one or the other establishes the performance of the rocket-assisted projectile under development although some compromise in the two approaches may be established by the design objectives.

The raw materials for metal injection molding are metal powders and a thermoplastic binder. There are at least two Binders included in the blend, a primary binder and a secondary binder. This blended powder mix is worked into the plasticized binder at elevated temperature in a kneader or shear roll extruder. The intermediate product is the so-called feedstock. It is usually granulated with granule sizes of several millimeters. In metal injection molding, only the binders are heated up, and that is how the metal is carried into the projectile shaped mold cavity.

Projectiles are molded by filling the mold cavity. Both mold design factors such as runner and gate size, gate placement, venting and molding parameters set on the molding machine affect the molded part. A helium Pycnometer can determine if there are voids trapped inside the parts. During molding, tool that can be used to measure the percent of theoretical density achieved on the "Green" or molded part. By crushing the measured "Green" molded part back to powder, you can now confirm the percent of air (or voids) trapped in the molded part. To measure this, the density of the molded part should be measured in the helium Pycnometer and compared to the theoretical density of the feedstock.

Then, take the same molded part that was used in the density test and crush it back to powder. If this granulate shows a density of more than 100% of that of the feedstock, then some of the primary binders have been lost during the molding process. The molding process needs to be corrected because using this process with a degraded feedstock will result in a larger shrinkage and result in a part smaller than that desired. It is vital to be sure that your molded parts are completely filled before continuing the manufacturing process for debinding and sintering. The helium Pycnometer provides this assurance. Primary debinding properly debound parts are extremely important to establish the correct sintering profile. The primary binder must be completely removed before attempting to start to remove the secondary binder as the secondary binder will travel through the pores created by the extraction of the primary binder. Primary debinding techniques depend on the feedstock type used to make the parts. However, the feedstock supplier knows the amount of primary binders that have been added and should be removed before proceeding to the next process step. The feedstock supplier provides a minimum "brown density" that must be achieved before the parts can be moved into a furnace for final debinding and sintering.

This minimum brown density will take into account that a small amount of the primary binder remnant may be present and could be removed by a suitable hold during secondary debinding and sintering. The sintering profile should be adjusted to remove the remaining small percent of primary binder before the removal of the secondary binder. Most external feedstock manufacturers provide only a weight loss percent that should be obtained to define suitable debinding. Solvent debound parts must be thoroughly dried, before the helium Pycnometer is used to determine the "brown" density so that the remnant solvent in the part does not affect the measured density value. When the feedstock manufacturer gives you the theoretical density of the "brown" or debound part, can validate the percent of debinding that has been achieved. Most Metal Injection Molding (MIM) operations today perform the secondary debinding and sintering in the same operation. Every MIM molder has gates and runners left over from molding their parts. So, you will be able to now re-use your gates and runners with confidence that they will shrink correctly after sintering. If the feedstock producers have given you the actual and theoretical densities of their feedstock, you can easily measure the densities of the gates and runners and compare the results to the values supplied. Once the regrind densities are higher than that required to maintain the part dimensions, the regrinds are no longer reusable.

Feedstock in accordance with the present invention may be prepared by blending the powdered metal with the binder and heating the blend to form a slurry. Uniform dispersion of the powdered metal in the slurry may be achieved by employing high shear mixing. The slurry may then be cooled to ambient temperature and then granulated to provide the feedstock for the metal injection molding.

The amount of powdered metal and binder in the feedstock may be selected to optimize moldability while insuring acceptable green densities. In one embodiment, the feedstock used for the metal injection molding portion of the invention may include at least about 40 percent by weight powdered metal, in another about 50 percent by weight powdered metal or more. In one embodiment, the feedstock includes at least about 60 percent by weight powdered metal, preferably about 65 percent by weight or more powdered metal. In yet another embodiment, the feedstock includes at least about 75 percent by weight powdered metal. In yet another embodiment, the feedstock includes at least about 80 percent by weight powdered metal. In yet another embodiment, the feedstock includes at least about 85 percent by weight powdered metal. In yet another embodiment, the feedstock includes at least about 90 percent by weight powdered metal.

The binding agent may be any suitable binding agent that does not destroy or interfere with the powdered metals. The binder may be present in an amount of about 50 percent or less by weight of the feedstock. In one embodiment, the binder is present in an amount ranging from 10 percent to about 50 percent by weight. In another embodiment, the binder is present in an amount of about 25 percent to about 50 percent by weight of the feedstock. In another embodiment, the binder is present in an amount of about 30 percent to about 40 percent by weight of the feedstock. In one embodiment, the binder is an aqueous binder. In another embodiment, the binder is an organic-based binder. Examples of binders include, but are not limited to, thermoplastic resins, waxes, and combinations thereof. Non-limiting examples of thermoplastic resins include polyolefins such as acrylic polyethylene, polypropylene, polystyrene, polyvinyl chloride, polyethylene carbonate, polyethylene glycol, and mixtures thereof. Suitable waxes include, but are not limited to, microcrystalline wax, bee wax, synthetic wax, and combinations thereof.

Examples of suitable powdered metals for use in the feedstock include, but are not limited to: stainless steel including martensitic and austenitic stainless steel, steel alloys, tungsten alloys, soft magnetic alloys such as iron, iron-silicon, electrical steel, iron-nickel (50Ni-50F3), low thermal expansion alloys, or combinations thereof. In one embodiment, the powdered metal is a mixture of stainless steel, brass and tungsten alloy. The stainless steel used in the present invention may be any 1 series carbon steels, 2 series nickel steels, 3 series nickel-chromium steels, 4 series molybdenum steels, series chromium steels, 6 series chromium-vanadium steels, 7 series tungsten steels, 8 series nickel-chromium-molybdenum steels, or 9 series silicon-manganese steels, e.g., 102, 174, 201, 202, 300, 302, 303, 304, 308, 309, 316, 316L, 316Ti, 321, 405, 408, 409, 410, 416, 420, 430, 439, 440, 446 or 601-665 grade stainless steel.

As known to those of ordinary skill in the art, stainless steel is an alloy of iron and at least one other component that imparts corrosion resistance. As such, in one embodiment, the stainless steel is an alloy of iron and at least one of chromium, nickel, silicon, molybdenum, or mixtures thereof. Examples of such alloys include, but are not limited to, an alloy containing about 1.5 to about 2.5 percent nickel, no more than about 0.5 percent molybdenum, no more than about 0.15 percent carbon, and the balance iron with a density ranging from about 7 $g/cm^3$ to about 8 $g/cm^3$; an alloy containing about 6 to about 8 percent nickel, no more than about 0.5 percent molybdenum, no more than about 0.15 percent carbon, and the balance iron with a density ranging from about 7 $g/cm^3$ to about 8 $g/cm^3$; an alloy containing about 0.5 to about 1 percent chromium, about 0.5 percent to about 1 percent nickel, no more than about 0.5 percent molybdenum, no more than about 0.2 percent carbon, and the balance iron with a density ranging from about 7 $g/cm^3$ to about 8 $g/cm^3$; an alloy containing about 2 to about 3 percent nickel, no more than about 0.5 percent molybdenum, about 0.3 to about 0.6 percent carbon, and the balance iron with a density ranging from about 7 $g/cm^3$ to about 8 $g/cm^3$; an alloy containing about 6 to about 8 percent nickel, no more than about 0.5 percent molybdenum, about 0.2 to about 0.5 percent carbon, and the balance iron with a density ranging from about 7 $g/cm^3$ to about 8 $g/cm^3$; an alloy containing about 1 to about 1.6 percent chromium, about 0.5 percent or less nickel, no more than about 0.5 percent molybdenum, about 0.9 to about 1.2 percent carbon, and the balance iron with a density ranging from about 7 $g/cm^3$ to about 8 $g/cm^3$; and combinations thereof.

Suitable tungsten alloys include an alloy containing about 2.5 to about 3.5 percent nickel, about 0.5 percent to about 2.5 percent copper or iron, and the balance tungsten with a density ranging from about 17.5 $g/cm^3$ to about 18.5 $g/cm^3$; about 3 to about 4 percent nickel, about 94 percent tungsten, and the balance copper or iron with a density ranging from about 17.5 $g/cm^3$ to about 18.5 $g/cm^3$; and mixtures thereof.

In addition, the binders may contain additives such as antioxidants, coupling agents, surfactants, elasticizing agents, dispersants, and lubricants as disclosed in U.S. Pat. No. 5,950,063, which is hereby incorporated by reference in its entirety. Suitable examples of antioxidants include, but are not limited to thermal stabilizers, metal deactivators, or combinations thereof. In one embodiment, the binder includes about 0.1 to about 2.5 percent by weight of the binder of an antioxidant. Coupling agents may include but are not limited to titanate, aluminate, silane, or combinations thereof. Typical levels range between 0.5 and 15% by weight of the binder.

For example, the metal injection molding process, which generally involves mixing fine metal powders with binders to form a feedstock that is injection molded into a closed mold, may be used to form a substantially cylindrical insert. After ejection from the mold, the binders are chemically or thermally removed from the substantially cylindrical insert so that the part can be sintered to high density. During the sintering process, the individual metal particles metallurgically bond together as material diffusion occurs to remove most of the porosity left by the removal of the binder.

The raw materials for metal injection molding are metal powders and a thermoplastic binder. There are at least two binders included in the blend, a primary binder and a secondary binder. This blended powder mix is worked into the plasticized binder at elevated temperature in a kneader or shear roll extruder. The intermediate product is the so-called feedstock. It is usually granulated with granule sizes of several millimeters. In metal injection molding, only the binders are heated up, and that is how the metal is carried into the mold cavity.

In preparing a feedstock, it is important first to measure the actual density of each lot of both the metal powders and binders. This is extremely important especially for the metal powders in that each lot will be different based on the actual chemistry of that grade of powder. For example, 316 L is comprised of several elements, such as Fe, Cr, Ni, Cu, Mo, P, Si, S and C. In order to be rightfully called a 316 L, each of these elements must meet a minimum and maximum percentage weight requirement as called out in the relevant specification. Hence the variation in the chemistry within the specification results in a significant density variation within the acceptable composition range. Depending on the lot received from the powder producer, the density will vary depending on the actual chemistry received.

In preparing a feedstock, it is important first to measure the actual density of each lot of both the metal powders and binders. This is extremely important especially for the metal powders in that each lot will be different based on the actual chemistry of that grade of powder. For example, 316 L is comprised of several elements, such as Fe, Cr, Ni, Cu, Mo, P, Si, S and C. In order to be rightfully called a 316 L, each of these elements must meet a minimum and maximum percentage weight requirement as called out in the relevant specification. Tables I-IV below provide other examples of the elemental compositions of some of the metal powders, feed stocks, metals, alloys and compositions of the present invention. Hence the variation in the chemistry within the specification results in a significant density variation within the acceptable composition range. Depending on the lot received from the powder producer, the density will vary depending on the actual chemistry received.

TABLE I

| Material Designation | Chemical Composition, % - Low-Alloy Steels | | | | |
|---|---|---|---|---|---|
| Code | Fe | Ni | Mo | C | Si (max) |
| MIM-2200[1] | Bal. | 1.5-2.5 | 0.5 max | 0.1 max | 1.0 |
| MIM-2700 | Bal. | 6.5-8.5 | 0.5 max | 0.1 max | 1.0 |
| MIM-4605[2] | Bal. | 1.5-2.5 | 0.2-0.5 | 0.4-0.6 | 1.0 |

TABLE II

| Material Designation | Chemical Composition, % - Stainless Steels | | | | | | | |
|---|---|---|---|---|---|---|---|---|
| Code | Fe | Ni | Cr | Mo | C | Cu | Nb + Ta | Mn (max) | Si (max) |
| MIM-316L | Bal. | 10-14 | 16-18 | 2-3 | 0.03 max | — | — | 2.0 | 1.0 |
| MIM-420 | Bal. | — | 12-14 | — | 0.15-0.4 | — | — | 1.0 | 1.0 |
| MIM-430L | Bal. | — | 16-18 | — | 0.05 max | — | — | 1.0 | 1.0 |
| MIM-17-4 PH | Bal. | 3-5 | 15.5-17.5 | — | 0.07 max | 3-5 | 0.15-0.45 | 1.0 | 1.0 |

TABLE III

| Material Designation | Chemical Composition, % - Soft-Magnetic Alloys | | | | | | |
|---|---|---|---|---|---|---|---|
| Code | Fe | Ni | Cr | Co | Si | C (max) | Mn | V |
| MIM-2200 | Bal. | 1.5-2.5 | — | — | 1.0 max | 0.1 | — | — |
| MIM-Fe-3% Si | Bal. | — | — | — | 2.5-3.5 | 0.05 | — | — |
| MIM-Fe50% Ni | Bal. | 49-51 | — | — | 1.0 max | 0.05 | — | — |
| MIM-Fe50% Co | Bal. | — | — | 48-50 | 1.0 max | 0.05 | — | 2.5 max |
| MIM-430L | Bal. | — | 16-18 | — | 1.0 max | 0.05 | 1.0 max | — |

TABLE IV

Nominal Chemical Composition, % - Controlled-Expansion Alloys

| Material Designation | Fe | Ni | Co | Mn max | Si max | C max | Al max | Mg max | Zr max | Ti max | Cu max | Cr max | Mo max |
|---|---|---|---|---|---|---|---|---|---|---|---|---|---|
| MIM-F15 | Bal. | 29 | 17 | 0.50 | 0.20 | 0.04 | 0.10 | 0.10 | 0.10 | 0.10 | 0.20 | 0.20 | 0.20 |

In addition to the specific compositions listed herein, the skill artisan recognizes the elemental composition of common commercial designations used by feedstock manufacturers and processors, e.g., C-0000 Copper and Copper Alloys; CFTG-3806-K Diluted Bronze Bearings; CNZ-1818 Copper and Copper Alloys; CNZP-1816 Copper and Copper Alloys; CT-1000 Copper and Copper Alloys; CT-1000-K Bronze Bearings; CTG-1001-K Bronze Bearings; CTG-1004-K Bronze Bearings; CZ-1000 Copper and Copper Alloys; CZ-2000 Copper and Copper Alloys; CZ-3000 Copper and Copper Alloys; CZP-1002 Copper and Copper Alloys; CZP-2002 Copper and Copper Alloys; CZP-3002 Copper and Copper Alloys; F-0000 Iron and Carbon Steel; F-0000-K Iron and Iron-Carbon Bearings; F-0005 Iron and Carbon Steel; F-0005-K Iron and Iron-Carbon Bearings; F-0008 Iron and Carbon Steel; F-0008-K Iron and Iron-Carbon Bearings; FC-0200 Iron-Copper and Copper Steel; FC-0200-K Iron-Copper Bearings; FC-0205 Iron-Copper and Copper Steel; FC-0205-K Iron-Copper-Carbon Bearings; FC-0208 Iron-Copper and Copper Steel; FC-0208-K Iron-Copper-Carbon Bearings; FC-0505 Iron-Copper and Copper Steel; FC-0508 Iron-Copper and Copper Steel; FC-0508-K Iron-Copper-Carbon Bearings; FC-0808 Iron-Copper and Copper Steel; FC-1000 Iron-Copper and Copper Steel; FC-1000-K Iron-Copper Bearings; FC-2000-K Iron-Copper Bearings; FC-2008-K Iron-Copper-Carbon Bearings; FCTG-3604-K Diluted Bronze Bearings; FD-0200 Diffusion-Alloyed Steel; FD-0205 Diffusion-Alloyed Steel; FD-0208 Diffusion-Alloyed Steel; FD-0400 Diffusion-Alloyed Steel; FD-0405 Diffusion-Alloyed Steel; FD-0408 Diffusion-Alloyed Steel; FF-0000 Soft-Magnetic Alloys; FG-0303-K Iron-Graphite Bearings; FG-0308-K Iron-Graphite Bearings; FL-4005 Prealloyed Steel; FL-4205 Prealloyed Steel; FL-4400 Prealloyed Steel; FL-4405 Prealloyed Steel; FL-4605 Prealloyed Steel; FL-4805 Prealloyed Steel; FL-48105 Prealloyed Steel; FL-4905 Prealloyed Steel; FL-5208 Prealloyed Steel; FL-5305 Prealloyed Steel; FLC-4608 Sinter-Hardened Steel; FLC-4805 Sinter-Hardened Steel; FLC-48108 Sinter-Hardened Steel; FLC-4908 Sinter-Hardened Steel; FLC2-4808 Sinter-Hardened Steel; FLDN2-4908 Diffusion-Alloyed Steel; FLDN4C2-4905 Diffusion-Alloyed Steel; FLN-4205 Hybrid Low-Alloy Steel; FLN-48108 Sinter-Hardened Steel; FLN2-4400 Hybrid Low-Alloy Steel; FLN2-4405 Hybrid Low-Alloy Steel; FLN2-4408 Sinter-Hardened Steel; FLN2C-4005 Hybrid Low-Alloy Steel; FLN4-4400 Hybrid Low-Alloy Steel; FLN4-4405 Hybrid Low-Alloy Steel; FLN4-4408 Sinter Hardened Steel; FLN4C-4005 Hybrid Low-Alloy Steel; FLN6-4405 Hybrid Low-Alloy Steel; FLN6-4408 Sinter-Hardened Steel; FLNC-4405 Hybrid Low-Alloy Steel; FLNC-4408 Sinter-Hardened Steel; FN-0200 Iron-Nickel and Nickel Steel; FN-0205 Iron-Nickel and Nickel Steel; FN-0208 Iron-Nickel and Nickel Steel; FN-0405 Iron-Nickel and Nickel Steel; FN-0408 Iron-Nickel and Nickel Steel; FN-5000 Soft-Magnetic Alloys; FS-0300 Soft-Magnetic Alloys; FX-1000 Copper-Infiltrated Iron and Steel; FX-1005 Copper-Infiltrated Iron and Steel; FX-1008 Copper-Infiltrated Iron and Steel; FX-2000 Copper-Infiltrated Iron and Steel; FX-2005 Copper-Infiltrated Iron and Steel; FX-2008 Copper-Infiltrated Iron and Steel; FY-4500 Soft-Magnetic Alloys; FY-8000 Soft-Magnetic Alloys; P/F-1020 Carbon Steel PF; P/F-1040 Carbon Steel PF; P/F-1060 Carbon Steel PF; P/F-10C40 Copper Steel PF; P/F-10050 Copper Steel PF; P/F-10060 Copper Steel PF; P/F-1140 Carbon Steel PF; P/F-1160 Carbon Steel PF; P/F-11C40 Copper Steel PF; P/F-11050 Copper Steel PF; P/F-11060 Copper Steel PF; P/F-4220 Low-Alloy P/F-42XX Steel PF; P/F-4240 Low-Alloy P/F-42XX Steel PF; P/F-4260 Low-Alloy P/F-42XX Steel PF; P/F-4620 Low-Alloy P/F-46XX Steel PF; P/F-4640 Low-Alloy P/F-46XX Steel PF; P/F-4660 Low-Alloy P/F-46XX Steel PF; P/F-4680 Low-Alloy P/F-46XX Steel PF; SS-303L Stainless Steel-300 Series Alloy; SS-303N1 Stainless Steel-300 Series Alloy; SS-303N2 Stainless Steel-300 Series Alloy; SS-304H Stainless Steel-300 Series Alloy; SS-304L Stainless Steel-300 Series Alloy; SS-304N1 Stainless Steel-300 Series Alloy; SS-304N2 Stainless Steel-300 Series Alloy; SS-316H Stainless Steel-300 Series Alloy; SS-316L Stainless Steel-300 Series Alloy; SS-316N1 Stainless Steel-300 Series Alloy; SS-316N2 Stainless Steel-300 Series Alloy; SS-409L Stainless Steel-400 Series Alloy; SS-409LE Stainless Steel-400 Series Alloy; SS-410 Stainless Steel-400 Series Alloy; SS-410L Stainless Steel-400 Series Alloy; SS-430L Stainless Steel-400 Series Alloy; SS-430N2 Stainless Steel-400 Series Alloy; SS-434L Stainless Steel-400 Series Alloy; SS-434LCb Stainless Steel-400 Series Alloy; and SS-434N2 Stainless Steel-400 Series Alloy.

Titanium alloys that may be used in this invention include any alloy or modified alloy known to the skilled artisan including titanium grades 5-38 and more specifically titanium grades 5, 9, 18, 19, 20, 21, 23, 24, 25, 28, 29, 35, 36 or 38. Grades 5, 23, 24, 25, 29, 35, or 36 annealed or aged; Grades 9, 18, 28, or 38 cold-worked and stress-relieved or annealed;

Grades 9, 18, 23, 28, or 29 transformed-beta condition; and Grades 19, 20, or 21 solution-treated or solution-treated and aged. Grade 5, also known as Ti6A14V, Ti-6A1-4V or Ti 6-4, is the most commonly used alloy. It has a chemical composition of 6% aluminum, 4% vanadium, 0.25% (maximum) iron, 0.2% (maximum) oxygen, and the remainder titanium. It is significantly stronger than commercially pure titanium while having the same stiffness and thermal properties (excluding thermal conductivity, which is about 60% lower in Grade 5 Ti than in CP Ti); Grade 6 contains 5% aluminum and 2.5% tin. It is also known as Ti-5Al-2.5Sn. This alloy has good weldability, stability and strength at elevated temperatures; Grade 7 and 7H contains 0.12 to 0.25% palladium. This grade is similar to Grade 2. The small quantity of palladium added gives it enhanced crevice corrosion resistance at low temperatures and high pH; Grade 9 contains 3.0% aluminum and 2.5% vanadium. This grade is a compromise between the ease of welding and manufacturing of the "pure" grades and the high strength of Grade 5; Grade 11 contains 0.12 to 0.25% palladium; Grade 12 contains 0.3% molybdenum and 0.8% nickel; Grades 13, 14, and 15 all contain 0.5% nickel and 0.05% ruthenium; Grade 16 contains 0.04 to 0.08% palladium; Grade 16H contains 0.04 to 0.08% palladium; Grade 17 contains 0.04 to 0.08% palladium; Grade 18 contains 3% aluminum, 2.5% vanadium and 0.04 to 0.08% palladium; Grade 19 contains 3% aluminum, 8% vanadium, 6% chromium, 4% zirconium, and 4% molybdenum; Grade 20 contains 3% aluminum, 8% vanadium, 6% chromium, 4% zirconium, 4% molybdenum and 0.04% to 0.08% palladium; Grade 21 contains 15% molybdenum, 3% aluminum, 2.7% niobium, and 0.25% silicon; Grade 23 contains 6% aluminum, 4% vanadium, 0.13% (maximum) Oxygen; Grade 24 contains 6% aluminum, 4% vanadium and 0.04% to 0.08% palladium. Grade 25 contains 6% aluminum, 4% vanadium and 0.3% to 0.8% nickel and 0.04% to 0.08% palladium; Grades 26, 26H, and 27 all contain 0.08 to 0.14% ruthenium; Grade 28 contains 3% aluminum, 2.5% vanadium and 0.08 to 0.14% ruthenium; Grade 29 contains 6% aluminum, 4% vanadium and 0.08 to 0.14% ruthenium; Grades 30 and 31 contain 0.3% cobalt and 0.05% palladium; Grade 32 contains 5% aluminum, 1% tin, 1% zirconium, 1% vanadium, and 0.8% molybdenum; Grades 33 and 34 contain 0.4% nickel, 0.015% palladium, 0.025% ruthenium, and 0.15% chromium; Grade 35 contains 4.5% aluminum, 2% molybdenum, 1.6% vanadium, 0.5% iron, and 0.3% silicon; Grade 36 contains 45% niobium; Grade 37 contains 1.5% aluminum; and Grade 38 contains 4% aluminum, 2.5% vanadium, and 1.5% iron. Its mechanical properties are very similar to Grade 5, but has good cold workability similar to grade 9. One embodiment includes a Ti6A14V composition. One embodiment includes a composition having 3-12% aluminum, 2-8% vanadium, 0.1-0.75% iron, 0.1-0.5% oxygen, and the remainder titanium. More specifically, about 6% aluminum, about 4% vanadium, about 0.25% iron, about 0.2% oxygen, and the remainder titanium. For example, one Ti composition may include 10 to 35% Cr, 0.05 to 15% Al, 0.05 to 2% Ti, 0.05 to 2% $Y_2O_5$, with the balance being either Fe, Ni or Co, or an alloy consisting of 20±1.0% Cr, 4.5±0.5% Al, 0.5±0.1% $Y_2O_5$ or ThO2, with the balance being Fe. For example, one Ti composition may include 15.0-23.0% Cr, 0.5-2.0% Si, 0.0-4.0% Mo, 0.0-1.2% Nb, 0.0-3.0% Fe, 0.0-0.5% Ti, 0.0-0.5% Al, 0.0-0.3% Mn, 0.0-0.1% Zr, 0.0-0.035% Ce, 0.005-0.025% Mg, 0.0005-0.005% B, 0.005-0.3% C, 0.0-20.0% Co, balance Ni. Sample Ti-based feedstock component includes 0-45% metal powder; 15-40% binder; 0-10% Polymer (e.g., thermoplastics and thermosets); surfactant 0-3%; lubricant 0-3%; sintering aid 0-1%. Another sample Ti-based feedstock component includes about 62% TiH2 powder as a metal powder; about 29% naphthalene as a binder; about 2.1-2.3% polymer (e.g., EVA/epoxy); about 2.3% SURFONIC N-100® as a Surfactant; lubricant is 1.5% stearic acid as; about 0.4% silver as a sintering Aid. Examples of metal compounds include metal hydrides, such as TiH2, and intermetallics, such as TiAl and $TiAl_3$. A specific instance of an alloy includes Ti-6Al,4V, among others. In another embodiment, the metal powder comprises at least approximately 45% of the volume of the feedstock, while in still another, it comprises between approximately 54.6% and 70.0%. In addition, Ti—Al alloys may consists essentially of 32-38% of Al and the balance of Ti and contains 0.005-0.20% of B, and the alloy which essentially consists of the above quantities of Al and Ti and contains, in addition to the above quantity of B, up to 0.2% of C, up to 0.3% of O and/or up to 0.3% of N (provided that 0+N add up to 0.4%) and c) 0.05-3.0% of Ni and/or 0.05-3.0% of Si, and the balance of Ti.

Both mold design factors such as runner and gate size, gate placement, venting and molding parameters set on the molding machine affect the molded part. A helium Pycnometer can determine if there are voids trapped inside the parts. During molding, you have a tool that can be used to measure the percent of theoretical density achieved on the "Green" or molded part. By crushing the measured "green" molded part back to powder, you can now confirm the percent of air (or voids) trapped in the molded part. To measure this, the density of the molded part should be measured in the helium Pycnometer and compared to the theoretical density of the feedstock. Then, take the same molded part that was used in the density test and crush it back to powder. If this granulate shows a density of more than 100% of that of the feedstock, then some of the primary binders have been lost during the molding process. The molding process needs to be corrected because using this process with a degraded feedstock will result in a larger shrinkage and result in a part smaller than that desired. It is vital to be sure that your molded parts are completely filled before continuing the manufacturing process for debinding and sintering. The helium Pycnometer provides this assurance. Primary debinding properly debound parts are extremely important to establish the correct sintering profile. The primary binder must be completely removed before attempting to start to remove the secondary binder as the secondary binder will travel through the pores created by the extraction of the primary binder. Primary debinding techniques depend on the feedstock type used to make the parts. However the feedstock supplier knows the amount of primary binders that have been added and should be removed before proceeding to the next process step. The feedstock supplier provides a minimum "brown density" that must be achieved before the parts can be moved into a furnace for final debinding and sintering. This minimum brown density will take into account that a small amount of the primary binder remnant may be present and could be removed by a suitable hold during secondary debinding and sintering. The sintering profile should be adjusted to remove the remaining small percent of primary binder before the removal of the secondary binder. Most external feedstock manufacturers provide only a weight loss percent that should be obtained to define suitable debinding. Solvent debound parts must be thoroughly dried, before the helium Pycnometer is used to determine the "brown" density so that the remnant solvent in the part does not affect the measured density value. When the feedstock manufacturer gives you the theoretical density of the "brown" or debound part, can validate the percent of debinding that has been achieved. Most MIM operations today perform the secondary debinding and sintering in the same operation. Every MIM molder has gates and runners left over from molding their parts. So, you will be able to now re-use your gates and runners with confidence that they will shrink correctly after sintering. If the feedstock producers have given you the actual and theoretical densities of their feedstock, you can easily measure the densities of the gates and runners and compare the results to the values supplied. Once the regrind densities are higher than that required to maintain the part dimensions, the regrinds are no longer reusable.

For example, one Ti composition may include 10 to 35% Cr, 0.05 to 15% Al, 0.05 to 2% Ti, 0.05 to 2% $Y_2O_5$, with the balance being either Fe, Ni or Co, or an alloy consisting of 20±1.0% Cr, 4.5±0.5% Al, 0.5±0.1% $Y_2O_5$ or $ThO_2$, with the balance being Fe. For example, one Ti composition may include 15.0-23.0% Cr, 0.5-2.0% Si, 0.0-4.0% Mo, 0.0-1.2% Nb, 0.0-3.0% Fe, 0.0-0.5% Ti, 0.0-0.5% Al, 0.0-0.3% Mn, 0.0-0.1% Zr, 0.0-0.035% Ce, 0.005-0.025% Mg, 0.0005-

0.005% B, 0.005-0.3% C, 0.0-20.0% Co, balance Ni. Sample Ti-based feedstock component includes 0-45% metal powder; 15-40% binder; 0-10% Polymer (e.g., thermoplastics and thermosets); surfactant 0-3%; lubricant 0-3%; sintering aid 0-1%. Another sample Ti-based feedstock component includes about 62% $TiH_2$ powder as a metal powder; about 29% naphthalene as a binder; about 2.1-2.3% polymer (e.g., EVA/epoxy); about 2.3% SURFONIC N-100® as a Surfactant; lubricant is 1.5% stearic acid as a; about 0.4% silver as a sintering Aid. Examples of metal compounds include metal hydrides, such as $TiH_2$, and intermetallics, such as TiAl and $TiAl_3$. A specific instance of an alloy includes Ti-6A1,4V, among others. In another embodiment, the metal powder comprises at least approximately 45% of the volume of the feedstock, while in still another, it comprises between approximately 54.6% and 70.0%. In addition, Ti—Al alloys may consists essentially of 32-38% of Al and the balance of Ti and contains 0.005-0.20% of B, and the alloy which essentially consists of the above quantities of Al and Ti and contains, in addition to the above quantity of B, up to 0.2% of C, up to 0.3% of 0 and/or up to 0.3% of N (provided that 0+N add up to 0.4%) and c) 0.05-3.0% of Ni and/or 0.05-3.0% of Si, and the balance of Ti.

Feedstock in accordance with the present invention may be prepared by blending the powdered metal with the binder and heating the blend to form a slurry. Uniform dispersion of the powdered metal in the slurry may be achieved by employing high shear mixing. The slurry may then be cooled to ambient temperature and then granulated to provide the feedstock for the metal injection molding.

One embodiment of the powdered metal may include a composition where Ni may be 2.0, 2.25, 2.50, 2.75, 3.0, 3.25, 3.5, 3.75, 4.0, 4.25, 4.50, 4.75, 5.0, 5.25, 5.5, 5.75, 6.0, 6.25, 6.50, 6.75, 7.0, 7.25, 7.5, 7.75, 8.0, 8.25, 8.50, 8.75, 9.0, 9.25, 9.5, 9.75, 10.0, 10.25, 10.50, 10.75, 11.0, 11.25, 11.5, 11.75, 12.0, 12.25, 12.50, 12.75, 13.0, 13.25, 13.5, 13.75, 14.0, 14.25, 14.50, 14.75, 15.0, 15.25, 15.5, 15.75, 16.0, 16.25, 16.50, 16.75, or 17.0%; Cr may be 9.0, 9.25, 9.5, 9.75, 10.0, 10.25, 10.50, 10.75, 11.0, 11.25, 11.5, 11.75, 12.0, 12.25, 12.50, 12.75, 13.0, 13.25, 13.5, 13.75, 14.0, 14.25, 14.50, 14.75, 15.0, 15.25, 15.5, 15.75, 16.0, 16.25, 16.50, 16.75, 17.0, 17.25, 17.5, 17.75, 18.0, 18.25, 18.50, 18.75, 19.0, 19.25, 19.5, 19.75, or 20.0%; Mo may be 0.00, 0.025, 0.050, 0.075, 0.10, 0.125, 0.150, 0.175, 0.20, 0.225, 0.250, 0.275, 0.30, 0.325, 0.350, 0.375, 0.40, 0.425, 0.450, 0.475, 0.50, 0.525, 0.550, 0.575, 0.60, 0.625, 0.650, 0.675, 0.70, 0.725, 0.750, 0.775, 0.80, 0.825, 0.850, 0.875, 0.90, 0.925, 0.950, 1.0, 1.25, 1.5, 1.75, 2.0, 2.25, 2.50, 2.75, 3.0, 3.25, 3.5, 3.75, 4.0, 4.25, 4.50, 4.75, 5.0, 5.25, 5.5, 5.75, 6.0, 6.25, 6.50, 6.75, or 7.0%; C may be 0.00, 0.025, 0.050, 0.075, 0.10, 0.125, 0.150, 0.175, 0.20, 0.225, 0.250, 0.275, 0.30, 0.325, 0.350, 0.375, 0.40, 0.425, 0.450, 0.475, 0.50, 0.525, 0.550, 0.575, 0.60, 0.625, 0.650, 0.675, 0.70, 0.725, 0.750, 0.775, 0.80, 0.825, 0.850, 0.875, 0.90, 0.925, 0.950, or 1.00%; Cu may be 0.00, 0.025, 0.050, 0.075, 0.10, 0.125, 0.150, 0.175, 0.20, 0.225, 0.250, 0.275, 0.30, 0.325, 0.350, 0.375, 0.40, 0.425, 0.450, 0.475, 0.50, 0.525, 0.550, 0.575, 0.60, 0.625, 0.650, 0.675, 0.70, 0.725, 0.750, 0.775, 0.80, 0.825, 0.850, 0.875, 0.90, 0.925, 0.950, 1.0, 1.25, 1.5, 1.75, 2.0, 2.25, 2.50, 2.75, 3.0, 3.25, 3.5, 3.75, 4.0, 4.25, 4.50, 4.75, 5.0, 5.25, 5.5, 5.75, 6.0, 6.25, 6.50, 6.75, 7.0, 7.25, 7.5, 7.75, or 8.0%; Nb+Ta may be 0.00, 0.025, 0.050, 0.075, 0.10, 0.125, 0.150, 0.175, 0.20, 0.225, 0.250, 0.275, 0.30, 0.325, 0.350, 0.375, 0.40, 0.425, 0.450, 0.475, 0.50, 0.525, 0.550, 0.575, 0.60, 0.625, 0.650, 0.675, 0.70, 0.725, 0.750, 0.775, or 0.80%; Mn may be 0.00, 0.025, 0.050, 0.075, 0.10, 0.125, 0.150, 0.175, 0.20, 0.225, 0.250, 0.275, 0.30, 0.325, 0.350, 0.375, 0.40, 0.425, 0.450, 0.475, 0.50, 0.525, 0.550, 0.575, 0.60, 0.625, 0.650, 0.675, 0.70, 0.725, 0.750, 0.775, 0.80, 0.825, 0.850, 0.875, 0.90, 0.925, 0.950, 1.0, 1.25, 1.5, 1.75, 2.0, 2.25, 2.50, 2.75, 3.0, 3.25, 3.5, 3.75, 4.0, 4.25, 4.50, 4.75, 5.0, 5.25, 5.5, 5.75, or 6.0%; Si may be 0.00, 0.025, 0.050, 0.075, 0.10, 0.125, 0.150, 0.175, 0.20, 0.225, 0.250, 0.275, 0.30, 0.325, 0.350, 0.375, 0.40, 0.425, 0.450, 0.475, 0.50, 0.525, 0.550, 0.575, 0.60, 0.625, 0.650, 0.675, 0.70, 0.725, 0.750, 0.775, 0.80, 0.825, 0.850, 0.875, 0.90, 0.925, 0.950, 1.0, 1.25, 1.5, 1.75, 2.0, 2.25, 2.50, 2.75, 3.0, 3.25, 3.5, 3.75, or 4.0%; and the balance Fe. For example, one embodiment of the powdered metal may include any amount in the range of 2-16% Ni; 10-20% Cr; 0-5% Mo; 0-0.6% C; 0-6.0% Cu; 0-0.5% Nb+Ta; 0-4.0% Mn; 0-2.0% Si and the balance Fe. One embodiment of the powdered metal may include any amount in the range of 2-6% Ni; 13.5-19.5% Cr; 0-0.10% C; 1-7.0% Cu; 0.05-0.65% Nb+Ta; 0-3.0% Mn; 0-3.0% Si and the balance Fe. One embodiment of the powdered metal may include any amount in the range of 3-5% Ni; 15.5-17.5% Cr; 0-0.07% C; 3-5.0% Cu; 0.15-0.45% Nb+Ta; 0-1.0% Mn; 0-1.0% Si and the balance Fe. One embodiment of the powdered metal may include any amount in the range of 10-14% Ni; 16-18% Cr; 2-3% Mo; 0-0.03% C; 0-2% Mn; 0-1% Si and the balance Fe. One embodiment of the powdered metal may include any amount in the range of 12-14% Cr; 0.15-0.4% C; 0-1% Mn; 0-1% Si and the balance Fe. One embodiment of the powdered metal may include any amount in the range of 16-18% Cr; 0-0.05% C; 0-1% Mn; 0-1% Si and the balance Fe.

The projectiles of the present invention may be made by metal injection molded using alloys include high strength steels, stainless steels plus Ni and Co super alloys; refractory metals, titanium and copper alloys; and low melting point alloys like brass, bronze, zinc and aluminum. The projectiles of the present invention may also be made by metal injection molded using stainless Steel: 304L, 316L, 17-4 PH, 15-5 PH, 420, 430, 440; Super alloys: Inconel, Hastelloy, Co-based Low Alloy Steels, 2-8% Ni (4600, 4650); Magnetic Alloys: 2-6% Si—Fe, 50% Ni—Fe, 50% Co—Fe; Alloys: Fe-36Ni (Invar), F-15 (Kovar); Materials: Pure Copper, Beryllium-Copper, Brass Steels: AISI M2, M3/2, M4, T15, M42, D2; Heavy Alloys: Tungsten-Copper, W—Fe—Ni, Molybdenum-Copper.

The present invention can be used to metal injection mold various materials including Brass compositions include MPIF CZ-1000-10 having a tensile strength of 20,000 PSI, a yield strength of 11,000 PSI, an elongation of 10.5% per inch, and an apparent hardness HRH 70-75; and MPIF CZ-2000-12 having a tensile strength of 30,000 PSI, a yield strength of 13,500 PSI, an elongation of 16% per inch, and an apparent Hardness HRH 75-80.

The present invention can be used to metal injection mold various materials including Copper compositions include MPIF C-0000-5 having a tensile strength of Tensile Strength 23,000 PSI, an elongation of 20% per inch, and an apparent hardness HRH 20-25.

The present invention can be used to metal injection mold various materials including lead. In addition compositions of lead with tin and/or antimony can be formed using the present invention. The present invention can be used to form a cup made of harder metal, such as copper, placed at the base of the bullet (i.e., a gas check) to decrease lead deposits by protecting the rear of the bullet against melting when fired at higher pressures.

The present invention can be used to metal injection mold various materials including jacketed bullets intended for even higher-velocity applications generally have a lead core that is jacketed or plated with gilding metal, cupronickel, copper alloys, or steel; a thin layer of harder metal protects the softer lead core when the bullet is passing through the barrel and during flight, which allows delivering the bullet intact to the target. There, the heavy lead core delivers its kinetic energy to the target. In addition to lead cores other more dense metals including hardened steel, tungsten, or tungsten carbide, and even a core of depleted uranium.

The present invention can be used to metal injection mold various materials including full metal jacket bullets are completely encased in the harder metal jacket, except for the base. Some bullet jackets do not extend to the front of the bullet, to aid expansion and increase lethality; these are called soft point or hollow point bullets. Steel bullets are often plated with copper or other metals for corrosion resistance during long periods of storage. Synthetic jacket materials such as nylon and TEFLON® can also be used as can hollow point bullets with plastic aerodynamic tips that improve accuracy and enhance expansion.

The present invention can be used to metal injection mold various materials including hard cast bullets which includes a hard lead alloy to reduce fouling of rifling grooves.

The present invention can be used to metal injection mold various materials including practice bullets made from lightweight materials including rubber, wax, plastic, or lightweight metal.

The present invention can be used to metal injection mold incendiary rounds from various materials including an explosive or flammable mixture in the tip that is designed to ignite on contact with a target. The intent is to ignite fuel or munitions in the target area, thereby adding to the destructive power of the bullet itself.

The present invention can be used to metal injection mold exploding rounds from various materials. Similar to the incendiary bullet, this type of projectile is designed to explode upon hitting a hard surface, preferably the bone of the intended target. Not to be mistaken for cannon shells or grenades with fuse devices, these bullets have only a cavity filled with a small amount of low explosive depending on the velocity and deformation upon impact to detonate.

The present invention can be used to metal injection mold tracer rounds from various materials. The tracer rounds have a hollow back, filled with a flare material. Usually this is a mixture of magnesium metal, a perchlorate, and strontium salts to yield a bright red color, although other materials providing other colors have also sometimes been used. Tracer material burns out after a certain amount of time. This type of round is also used by all branches of the United States military in combat environments as a signaling device to friendly forces. The flight characteristics of tracer rounds differ from normal bullets due to their lighter weight.

The present invention can be used to metal injection mold armor piercing rounds from various materials. Jacketed designs where the core material is a very hard, high-density metal such as tungsten, tungsten carbide, depleted uranium, or steel. A pointed tip is often used, but a flat tip on the penetrator portion is generally more effective. The most common bullet jacket material is a copper, nickel, or steel jacket over a lead core; however, other core materials may be used including depleted Uranium, Tungsten as well as other jacketing materials.

In addition multiple layer projectiles may be formed using the metal injection molding of the present invention. For example, a steel core may be covered with a layer of lead that is then covered with a layer of copper; a depleted Uranium may be covered with a layer of Tungsten that is then covered with a layer of copper; a steel core may be covered with a layer of lead that is then covered with a polymer layer; a pelleted core (e.g., small lead pellets, plastic, or a silicone rubber material) may be covered with a layer of lead, copper or polymer; or other variations.

The present invention can be used to metal injection mold various materials including nontoxic shot such as steel, bismuth, tungsten, and other exotic bullet alloys prevent release of toxic lead into the environment.

The present invention can be used to metal injection mold rounds from various materials including blended-metals such as bullets made using cores from powdered metals and mixtures of different powered metals.

The present invention can be used to metal injection mold frangible rounds from various materials. These are designed to disintegrate into tiny particles upon impact to minimize their penetration for reasons of range safety, to limit environmental impact, or to limit the shoot-through danger behind the intended target. The bullet may be made from an amalgam of metal and a hard frangible plastic binder designed to penetrate a human target and release its component shot pellets without exiting the target.

The present invention can be used to metal injection mold various materials including solid or monolithic solid metal rounds including mono-metal bullets intended for deep penetration with slender shaped very-low-drag projectiles for long range shooting. Such metals include oxygen free copper and alloys like copper nickel, tellurium copper and brass including UNS C36000 Free-Cutting Brass.

The present invention can be used to metal injection mold sabot rounds from various materials. The sabot round may include a multiple piece bullet having a smaller bullet surrounded by a larger carrier bullet (or sabot) that passes through the barrel and once leaving the barrel the sabot and the smaller bullet separate with the sabot falling to the ground fairly close to the barrel and the light weighted smaller bullet traveling down range at a high velocity without any identifiable rifling characteristics.

The description of the preferred embodiments should be taken as illustrating, rather than as limiting, the present invention as defined by the claims. As will be readily appreciated, numerous combinations of the features set forth above can be utilized without departing from the present invention as set forth in the claims. Such variations are not regarded as a departure from the spirit and scope of the invention, and all such modifications are intended to be included within the scope of the following claims.

It will be understood that particular embodiments described herein are shown by way of illustration and not as limitations of the invention. The principal features of this invention can be employed in various embodiments without departing from the scope of the invention. Those skilled in the art will recognize, or be able to ascertain using no more than routine experimentation, numerous equivalents to the specific procedures described herein. Such equivalents are considered to be within the scope of this invention and are covered by the claims.

All publications and patent applications mentioned in the specification are indicative of the level of skill of those skilled in the art to which this invention pertains. All publications and patent applications are herein incorporated by reference to the same extent as if each individual publication or patent application was specifically and individually indicated to be incorporated by reference.

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device, the method being employed to determine the value, or the variation that exists among the study subjects.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AB, BBC, AAABCCCC, CBBAAA, CABABB, and so forth. The skilled artisan will understand that typically there is no limit on the number of items or terms in any combination, unless otherwise apparent from the context.

All of the compositions and/or methods disclosed and claimed herein can be made and executed without undue experimentation in light of the present disclosure. While the compositions and methods of this invention have been described in terms of preferred embodiments, it will be apparent to those of skill in the art that variations may be applied to the compositions and/or methods and in the steps or in the sequence of steps of the method described herein without departing from the concept, spirit and scope of the invention. All such similar substitutes and modifications apparent to those skilled in the art are deemed to be within the spirit, scope and concept of the invention as defined by the appended claims.

What is claimed is:

1. A method of making a metal injection molded ammunition comprising the steps of:
   providing an ammunition cartridge mold comprising a bottom portion having a primer recess extending into the bottom portion adapted to receive a primer, a flash hole positioned in the primer recess through the bottom surface; side walls extending from the bottom portion to a nose end aperture, wherein a propellant chamber is formed between the nose end aperture and the bottom surface;
   injecting a metal composition into the ammunition cartridge mold to form a metal injection molded ammunition cartridge, wherein the metal composition comprises stainless steel, brass, copper and cobalt and nickel alloys, tungsten, tungsten carbide, carballoy, ferro-tungsten, titanium, copper, cobalt, nickel, alumina oxide, zirconia and aluminum; and
   removing the metal injection molded ammunition cartridge from the ammunition cartridge mold;
   inserting a primer into the primer recess;
   at least partially filling the propellant chamber with a propellant; and
   inserting a projectile into the nose end aperture.

2. The metal injection molded ammunition of claim 1, further comprising the step of forming a shoulder in the metal injection molded ammunition cartridge.

3. The metal injection molded ammunition of claim 2, further comprising the step of forming a neck between the shoulder and the nose end aperture to form a projectile aperture.

4. The metal injection molded ammunition of claim 1, wherein the metal composition comprises:
   a) 2-16% Ni; 10-20% Cr; 0-5% Mo; 0-0.6% C; 0-6.0% Cu; 0-0.5% Nb+Ta; 0-4.0% Mn; 0-2.0% Si and the balance Fe;
   b) 2-6% Ni; 13.5-19.5% Cr; 0-0.10% C; 1-7.0% Cu; 0.05-0.65% Nb+Ta; 0-3.0% Mn; 0-3.0% Si and the balance Fe;
   c) 3-5% Ni; 15.5-17.5% Cr; 0-0.07% C; 3-5.0% Cu; 0.15-0.45% Nb+Ta; 0-1.0% Mn; 0-1.0% Si and the balance Fe;
   d) 10-14% Ni; 16-18% Cr; 2-3% Mo; 0-0.03% C; 0-2% Mn; 0-1% Si and the balance Fe;
   e) 12-14% Cr; 0.15-0.4% C; 0-1% Mn; 0-1% Si and the balance Fe;
   f) 16-18% Cr; 0-0.05% C; 0-1% Mn; 0-1% Si and the balance Fe;
   g) 3-12% aluminum, 2-8% vanadium, 0.1-0.75% iron, 0.1-0.5% oxygen, and the remainder titanium; or
   h) about 6% aluminum, about 4% vanadium, about 0.25% iron, about 0.2% oxygen, and the remainder titanium.

5. The metal injection molded ammunition of claim 1, wherein the metal injection molded ammunition cartridge is a 5.56 mm, 7.62 mm, 308, 338, 3030, 3006, 50 caliber, 45 caliber, 380 caliber, 38 caliber, 9 mm, 10 mm, 12.7 mm, 14.5 mm, or 14.7 mm ammunition cartridge.

6. The metal injection molded ammunition of claim 1, wherein the metal injection molded ammunition cartridge is 20 mm, 25 mm, 30 mm, 40 mm, 57 mm, 60 mm, 75 mm, 76 mm, 81 mm, 90 mm, 100 mm, 105 mm, 106 mm, 115 mm, 120 mm, 122 mm, 125 mm, 130 mm, 152 mm, 155 mm, 165 mm, 175 mm, 203 mm, 460 mm, 8 inch, or 4.2 inch.

7. The metal injection molded ammunition of claim 1, wherein the metal composition comprises 102, 174, 201, 202, 300, 302, 303, 304, 308, 309, 316, 316L, 316Ti, 321, 405, 408, 409, 410, 415, 416, 416R, 420, 430, 439, 440, 446 or 601-665 grade stainless steel.

8. The metal injection molded ammunition of claim 1, wherein the metal composition comprises 2-16% Ni; 10-20% Cr; 0-5% Mo; 0-0.6% C; 0-6.0% Cu; 0-0.5% Nb+Ta; 0-4.0% Mn; 0-2.0% Si and the balance Fe; 2-6% Ni; 13.5-19.5% Cr; 0-0.10% C; 1-7.0% Cu; 0.05-0.65% Nb+Ta; 0-3.0% Mn; 0-3.0% Si and the balance Fe; 3-5% Ni; 15.5-17.5% Cr; 0-0.07% C; 3-5.0% Cu; 0.15-0.45% Nb+Ta; 0-1.0% Mn; 0-1.0% Si and the balance Fe; 10-14% Ni; 16-18% Cr; 2-3% Mo; 0-0.03% C; 0-2% Mn; 0-1% Si and the balance Fe; 12-14% Cr; 0.15-0.4% C; 0-1% Mn; 0-1% Si and the balance Fe; 16-18% Cr; 0-0.05% C; 0-1% Mn; 0-1% Si and the balance Fe; 3-12% aluminum, 2-8% vanadium, 0.1-0.75% iron, 0.1-0.5% oxygen, and the remainder titanium; or 6% aluminum, about 4% vanadium, about 0.25% iron, about 0.2% oxygen, and the remainder titanium.

9. The metal injection molded ammunition of claim 1, wherein the metal composition comprises brass or a brass alloy.

* * * * *